United States Patent [19]

Isozaki

[11] Patent Number: 5,999,905
[45] Date of Patent: Dec. 7, 1999

[54] APPARATUS AND METHOD FOR PROCESSING DATA TO MAINTAIN CONTINUITY WHEN SUBSEQUENT DATA IS ADDED AND AN APPARATUS AND METHOD FOR RECORDING SAID DATA

[75] Inventor: Masaaki Isozaki, Kanagawa, Japan

[73] Assignee: Sony Corporation, Tokyo, Japan

[21] Appl. No.: 08/907,390

[22] Filed: Aug. 7, 1997

[30] Foreign Application Priority Data

Dec. 13, 1995 [JP] Japan .................................. 7-324818
Dec. 11, 1996 [WO] WIPO ..................... PCT/JP96/03610

[51] Int. Cl.⁶ .............................. G10L 9/18; H03M 7/30
[52] U.S. Cl. ......................................... 704/500; 704/503
[58] Field of Search .................................. 704/500, 501, 704/503, 504; 360/32

[56] References Cited

U.S. PATENT DOCUMENTS 5,371,604  12/1994  Gotou et al. ............................ 358/337

FOREIGN PATENT DOCUMENTS

| 0 574 238 A1 | 12/1993 | European Pat. Off. . |
| 5-344468 | 12/1993 | Japan . |
| 6-284365 | 10/1994 | Japan . |
| 8-279246 | 10/1996 | Japan . |
| 8-287602 | 11/1996 | Japan . |

Primary Examiner—Susan Wieland
Attorney, Agent, or Firm—Frommer Lawrence & Haug, LLP.; William S. Frommer

[57] ABSTRACT

A data processing apparatus for encoding data in which first information data from a first source of information data is supplied together with a reference timing value and subsequently a plurality of successive sources of information data of a predetermined processing unit are input when said first information data is finished being supplied. The data processing apparatus produces an encoding start point for the successive sources of data, as a function of a phase difference value between a predetermined reference timing value obtained before the successive sources of information data are input and a start point of the successive processing unit.

26 Claims, 12 Drawing Sheets

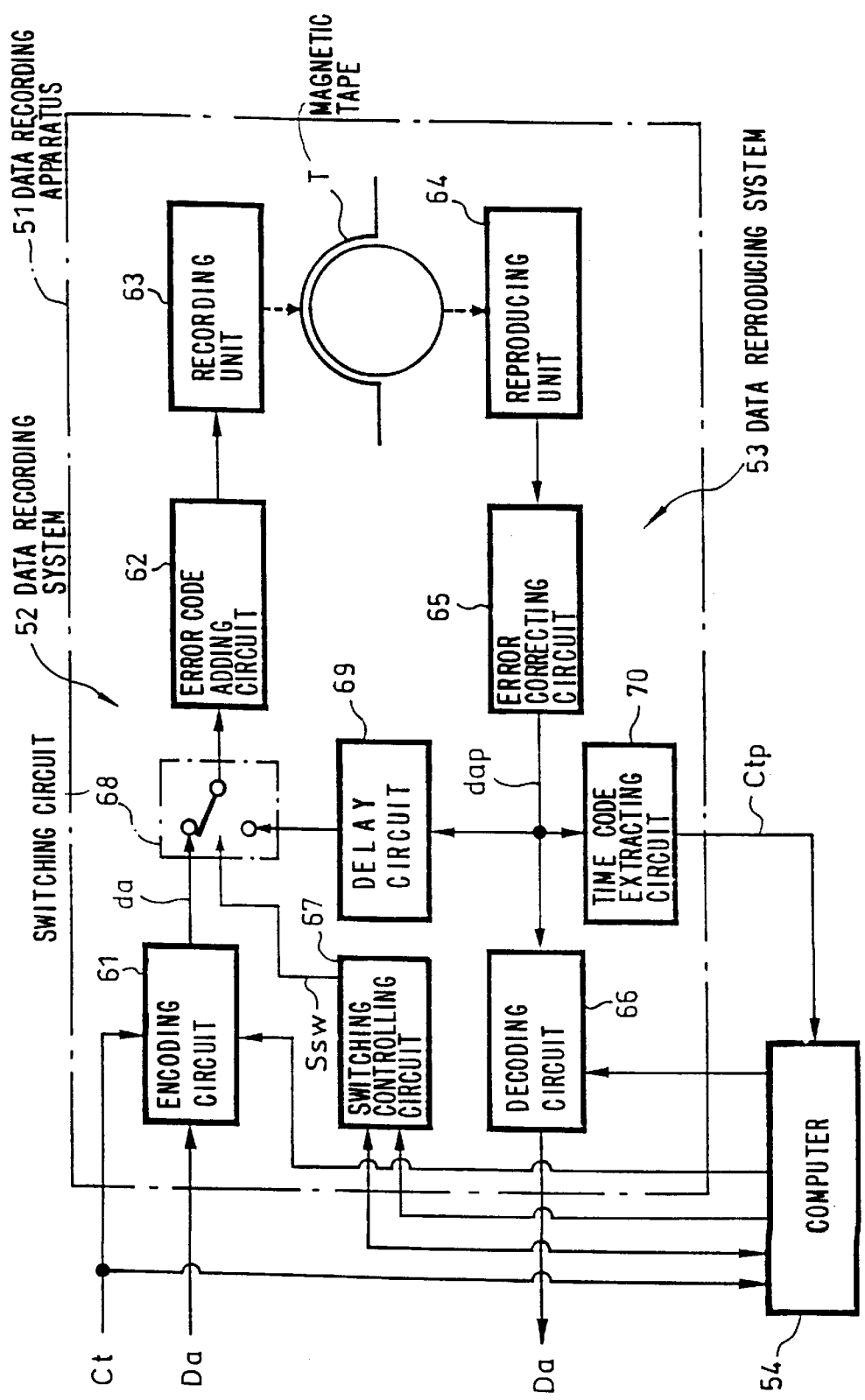

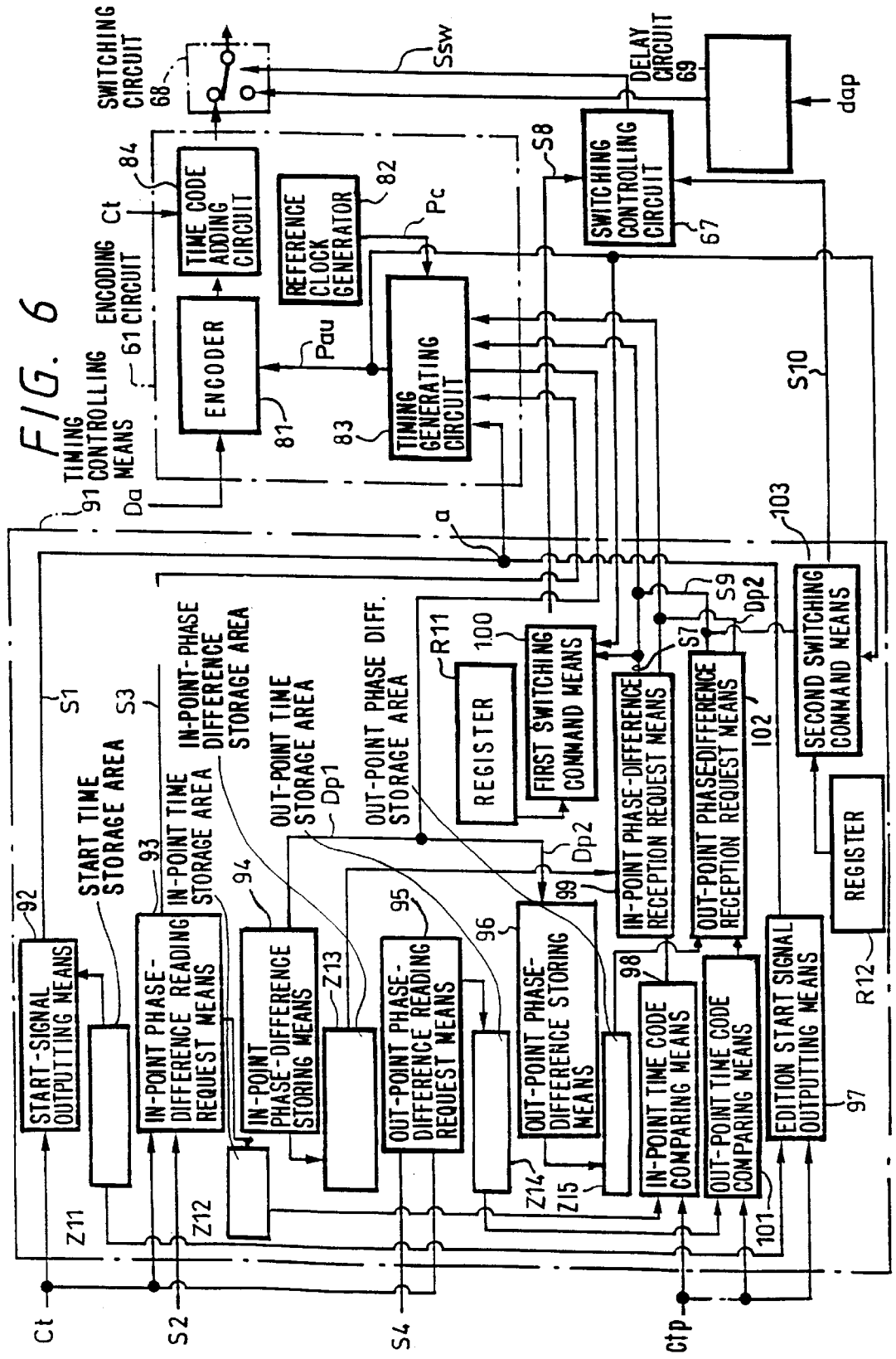

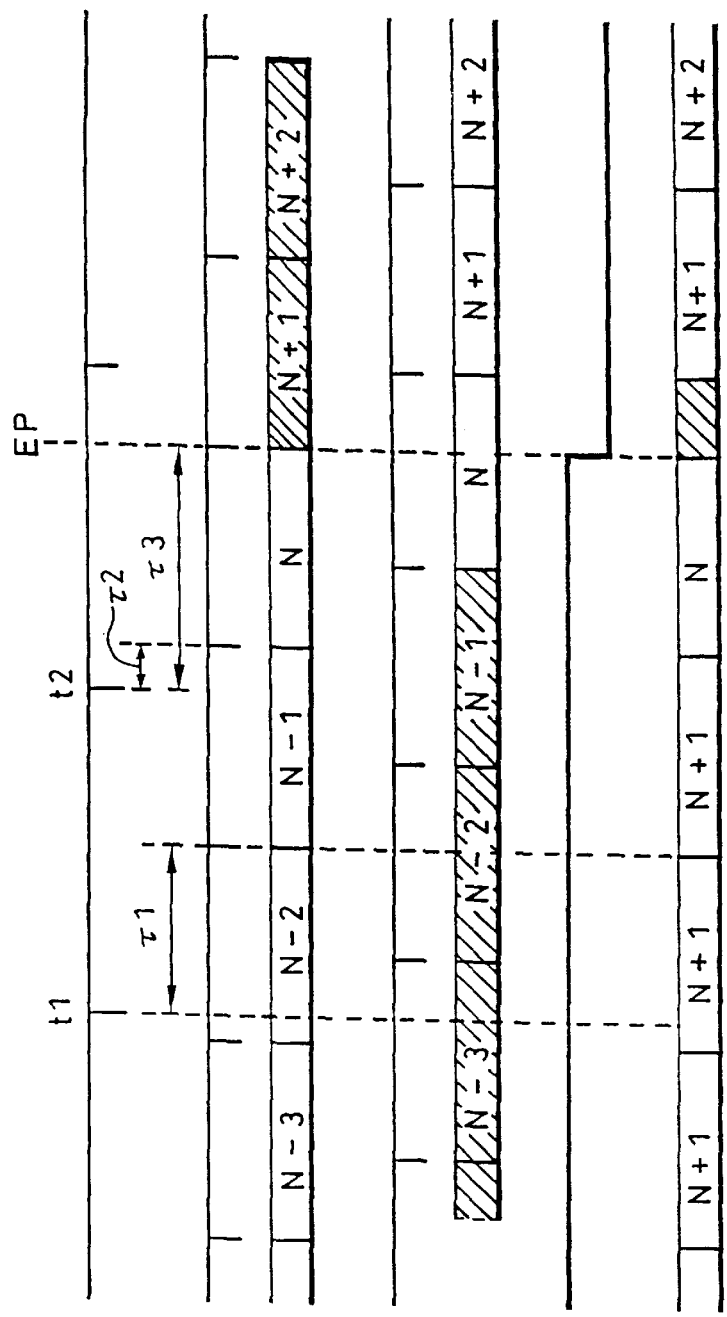

APPARATUS AND METHOD FOR PROCESSING DATA TO MAINTAIN CONTINUITY WHEN SUBSEQUENT DATA IS ADDED AND AN APPARATUS AND METHOD FOR RECORDING SAID DATA

TECHNICAL FIELD

The present invention relates to a data processing apparatus for and a data processing method of encoding dividing information data supplied together with a reference timing with a plurality of sources being successively switched, into data of a predetermined processing unit to encode them, and which are suitable for use in edition of data to be recorded on a DVD (digital video disk), for example.

BACKGROUND ART

In a field of a digital audio data compression technique, a subband coding (Subband Coding: SBC) system, an adaptive transform coding (Adaptive Transform Coding: ATC) system and so on are generally employed in order to reduce a data amount. A digital equipment for recording audio data thus coded on a recording medium, transmitting them to a transmission line or signal-processing them may be increased in the future. In these coding systems, a digital audio data is divided into a block unit (audio frame unit) and then coded.

In the above subband coding system, an input audio signal is divided into signals of plural frequency bands and each of the divided signals of the plural frequency bands is independently coded by utilizing deviation of electric powers in each of the frequency bands. Specifically, the input audio signal is divided into the signals of plural subbands, which reduces deviation of a signal energy in each of the subbands, thereby a dynamic range being reduced. A bit corresponding to the signal energy of each of the subbands is allocated.

When the input audio signal is divided into the signals of the subbands, dichtomization of the frequency band is repeatedly carried out by using a plurality of orthogonal mirror filters (QMF), thereby the tree-structured subbands being obtained. Signal samples in the divided low frequency band and the divided high frequency band are each thinned out to ½, thereby sampling frequencies thereof becoming a half.

In a transform coding system, an input audio signal is subjected to linear transformation for increasing concentration of electric power and then quantized, thereby a coding efficiency being improved. A transform coding allocating adaptively a bit is particularly called the adaptive transform coding system. Fourier transform, cosine transform or the like, for example, is employed as the above linear transform.

When the subband coding system or the adaptive transform coding system is employed, if a signal is quantized after being subjected to some weighting by using a psycho-acoustic characteristic so that deterioration of the signal in a band which human being can perceive should be minimum, then it is possible to further improve a total coding quality.

Psycho-acoustic weighting (Psycho-acoustic Weighting) is a weighting method of sequentially calculating a temporal threshold value (Temporal Threshold) of an audible range by using an absolute threshold value (Absolute Threshold) thereof and a relative threshold value thereof determined by a masking effect. Bit allocation is carried out based on the above temporal threshold value.

A typical algorithm of an audio data coding system will be described in accordance with an algorithm of MPEG/Audio standard.

Initially, an input PCM audio data linearly quantized with 16 bits, for example, is converted from that of a time domain into signals of 32 frequency bands. A masking level for masking a quantization error based on the psycho-acoustic characteristic is calculated in order to allocate bits upon quantization.

The converted signals obtained as described above are quantized in accordance with the bit allocation based on the psycho-acoustic characteristic mode and then coded, thereafter being inserted into a frame together with a data which a user can arbitrarily define.

When the coded data is decoded, the data which a user can arbitrarily define is separated therefrom and the frame is deblocked and block data is decoded and inverse-quantized with reference to a supplied side information about the bit allocation. Then, the inverse-quantized signal is converted reversely to the coding processing, thereby the signal of the time domain being restored.

In the above MPEG/Audio standard, algorithms of three kinds, i.e., layer I, layer II and layer III are prescribed. In this case, while an algorithm becomes complicated in an order of the layer I, the layer II and the layer III, a sound quality is at the same time improved in the above order. The sound quality also depends upon a bit rate to be used. While bit rates of 14 kinds ranging from 32 kb/s to 448 kb/s, 384 kb/s and 320 kb/s are respectively prescribed for the layers I to III, bit rates which are main objects (target bit rates) of the respective layers are limited.

When, for example, the algorithm of the layer II is employed, as shown in FIG. 10B, an audio data is processed by an audio frame unit (one audio frame unit includes 1152 samples according to the layer II) by using an audio frame pulse shown in FIG. 10A and thereby converted into coded audio data, i.e, a bit stream.

As a digital signal processing technique is developed recently, a DVD video disk for storing data of one movie amount in an optical disk (whose diameter is 120 mm) is developed. This DVD video disk is manufactured by multiplexing coded video data, coded audio data an coded attached information such as a superimposed dialogue or the like to record the multiplexed data on one optical disk.

FIG. 11 shows an arrangement of a DVD video disk editing system (authoring system) employing an encoder for simultaneously encoding a video data and an audio data, by way of example. This authoring system has a digital VTR 101, an encoder 102, and a computer 103.

The digital VTR 101 has a video reproducing unit 101A for reproducing a digital video data from a video tape digitally recorded, and an audio reproducing unit 101B for reproducing a digital audio data from an audio tape TP digitally recorded.

The encoder 102 encodes a video data Dv and an audio data Da from the above digital VTR 101 under the control of the computer 103 and further multiplexes the encoded video data and the encoded audio data to output them as a series of bit streams.

Processings of encoding the above video data Dv and the above audio data Da are carried out in accordance with algorithms described in a video encoding program and an audio encoding program stored in a main memory device of the computer 103, respectively. Respective processings of multiplexing the encoded video data and the encoded audio data are carried out in accordance with an algorithm described in a multiplexing program stored in the main memory device of the computer 103.

The above authoring system encodes reproduced data from the digital VTR 101 and so on, i.e., the video data Dv and the audio data Da in the above example and converts the video data Dv and the audio data Da into data of respective predetermined data rates. Then, the authoring system rearranges both of the video data and the audio data in accordance with predetermined formats to record them on a recording medium such as an optical disk or the like.

When an audio data is encoded (Encoded) in a system for carrying out the authoring, if there is only one digital audio tape TP loaded onto an audio reproducing apparatus for reproducing an audio tape, then continuous processing of the audio tape from the head thereof makes encoded audio frames successive throughout.

If a plurality of digital audio tapes TP are loaded into the digital VTR 101, then when a digital audio tape TP loaded into the audio reproducing apparatus unit 101B of the digital VTR 101B of the digital VTR 101 is exchanged for another one, it is impossible to obtain a phase difference (offset) between an audio frame of an audio data da reproduced from the previously loaded digital audio tape TP and the latest reference timing (video frame) thereof. Therefore, an audio frame of an audio data to be reproduced from a newly loaded digital audio tape TP and the audio frame of the previously loaded digital audio tape TP are prevented from becoming continuous.

Specifically, when the audio data Da is encoded, a plurality of audio samples as one processing unit (an audio frame) are calculated. Since the number of the audio samples to be encoded as set forth is set to a value which is convenient to the coding calculation, a frame period of the audio frame inevitably has no relation with a period of a processing unit of video data Dv (a video frame).

Therefore, if the audio data is encoded with the audio and video frames being not synchronized with each other, then the audio samples having the same time code value may be inserted into different audio frames depending upon the coding processing (i.e., reproducibility may be lacked).

This lack of reproducibility will specifically be described with reference to FIG. 12. It is assumed that when there is a phase difference (offset) of time τ1 between a frame pulse at t1 of a video frame shown in FIG. 12A and an (N−1)th audio frame obtained when a first tape is reproduced as shown in FIGS. 12B and 12C, there is an offset of time τ2 between a frame pulse at t2 of the video frame and an (N)th audio frame, and there is an offset of time τ3 between the above time τ2 and an (N+l)th audio frame, after the (N)th audio frame is completely encoded, a second tape is inserted into the digital VTR 101 instead of the first tape and then reproduced.

In this case, when the second tape is reproduced, a frame period generally becomes different from a frame period obtained when the first tape is reproduced. It is usual that as shown in FIGS. 12D and 12E, an audio data from a frame prior to a target (N+1)th frame, e.g., an (N−2)th frame is recorded as a so-called "margin" on the second tape.

Therefore, when the audio data is transmitted to an encoding processing system of an encoder, the "margin" portion is skipped and the audio data from the target (N+1)th frame is transmitted. At this time, as described above, since a timing of a frame period with respect to the first tape is different from a timing of a frame period with respect to the second period, if at an edition timing at an edition point EP shown in FIG. 12F an audio data of the (N+1)th frame is derived in accordance with the frame period with respect to the second tape as it is, then an unnecessary audio sample of encoded data shown in FIG. 12G is added to a portion between the audio data of the (N)th frame from the first tape and the audio data of the (N+1) th frame from the second tape, which prevents the (N)th audio frame and the (N+1)th audio frame from being made continuous.

If the audio data is encoded under a state that the audio frames are discontinuous, then it prevents a decoder of a DVD player for reproducing a DVD video disk from correctly decoding the audio data, which provides problems for an authoring system.

In order to make audio frames of different tapes continuous, two methods can be considered: a first method of previously storing a plurality of audio data in some suitable means to thereafter edit them so that all the audio frames should be continuous; and a second method of dividing an audio data at a silent portion whose data may be encoded twice or removed if audio frames of different tapes are not aligned.

If the first method is employed, then a memory having a large capacity is required disadvantageously. If the second method is employed, then it is not practical because there is no ground that a silent portion is regularly produced on a tape.

In view of the above aspects, it is an object of the present invention to provide a data processing apparatus and a data processing method which, when information data supplied together with a reference timing while a plurality of sources are switched is divided into data of predetermined processing units and then encoded, can keep the processing units used for encoding continuous at a source switch point and allow the source to be divided at an optional point regardless of whether the point is a silent portion.

It is another object of the present invention to provide a data recording apparatus and a data recording method which, when a digital data formed by inserting another information data into a reference information data input together with a reference timing is divided into data of predetermined processing units and then encoded and the encoded data are recorded on a recording medium, can keep continuity of the processing units used for an encoding processing at an insertion point of the another data, and can make the encoded data of a reference information data and the encoded data of the another information data continuous at the above insertion point to record them on a recording medium.

DISCLOSURE OF THE INVENTION

A data processing apparatus (or a data processing method) according to the present invention is a data processing apparatus (or a data processing method) having an encoding processing means for dividing an information data supplied together with a reference timing with a plurality of sources being successively switched, into data of a predetermined processing unit to encode them, and characterized by having an encoding start point generating means (or an encoding start point generating step of) for keeping the phase difference between the predetermined reference timing preceding the switch point of the sources and a start point of the processing unit and for generating a start point of a processing unit for encoding the information data from a switched source by a processing unit based on the phase difference.

With this arrangement, if information data supplied from two different sources, for example, are divided into data of processing units and then encoded, the information data supplied from the first source is divided into data of processing units as it is and then encoded.

Subsequently, a processing of dividing the information data supplied from the second source into data of the processing units is the focus of encoding processing. According to the present invention, a phase difference between a predetermined reference timing before a source switching point and a start point of the above processing unit is kept. A start point of a processing for encoding the information data from a switched source by a processing unit is generated based on the above phase difference.

Specifically, in the processing for encoding the information data from the switched source, a phase difference between the above predetermined reference timing of the first source and a start point of the processing unit is reproduced. As a result, in the processing for encoding the reproduced data from the second source, an output timing of the processing units located after the output of the above predetermined reference timing is synchronized with an output timing of the processing unit used in the processing for encoding the reproduced data from the first source.

Therefore, if the encoding processing is started from the switch point of the reproduced data from the second source in the above encoding processing, then the encoded data of a processing unit of the reproduced data from the second source successively succeeds the encoded data of a processing unit of the reproduced data from the first source. Thus, it is possible to secure the continuity between the encoded data of the reproduced data from the first source and the encoded data of the reproduced data from the second source.

As described above, according to the data processing apparatus and the data processing method of the present invention, when the information data supplied together with the reference timing while a plurality of sources are switched are divided into data of a predetermined unit and the divided data are encoded, it is possible to keep continuity of the processing units used for the encoding at the point where sources are switched and to divide the source at an optional point regardless of a silent portion and so on.

A data recording apparatus (or a data recording method) according to the present invention is a data recording apparatus (or a data recording method) in which a digital data formed by inserting another information data into a reference information data input together with a reference timing is divided into data of predetermined processing units, and the encoded data are recorded on a recording medium, characterized in that a phase difference between a predetermined reference timing synchronized with the reference timing and preceding an insertion start point indicative of a start of inserting the another information data into the reference information data and a start point of the processing unit is kept, a start point of the processing for encoding the another information data by a processing unit is generated based on the phase difference, and data to be subjected to the encoding processing is switched from the reference information data to the another information data at the encoding start point after insertion start point.

With this arrangement, when the reference information data is encoded in the encoding processing and then recorded as the encoded data on the recording medium, a phase difference between the predetermined reference timing preceding the insertion start point indicative of the start of inserting the another information data and the start point of the processing unit is kept.

The start point of the processing for encoding the another information data by a processing unit is generated based on the above phase difference. At the encoding start point after the above insertion start point, the data is switched from the reference information data to the another information data which is then encoded. This encoded data is recorded on the recording medium.

Specifically, in the processing for encoding the another information data, the phase difference between the predetermined reference timing of the reference information data and the start point of the processing unit is reproduced. As a result, in the processing for encoding the another information data, the output timing of the encoding start point (processing unit) located after the insertion start point is synchronized with the output timing of the processing unit used for the processing of encoding the reference information data.

Therefore, in the encoding processing, if the encoding processing is started from the insertion start point of the another information data, then the encoded data each formed of a processing unit of the another information data successively succeeds the encoded data of the reference information data. Thus, the insertion (insertion edition) of the another data at th e insertion start point can reliably be carried out.

As described above, according to the data recording apparatus and the data recording method of the present invention, when the digital data formed by inserting another information data into a reference information data in put together with a reference timing is divided into data of predetermined processing units and then encoded and the encoded data are recorded on the recording medium, it is possible to keep continuity of the processing units used for the encoding processing at the insertion point of the another data, and it is possible to make the encoded data of the reference information data and the encoded data of the another information data continuous at the above insertion point to record them on the re cording medium.

BRIEF DESCRIPTION OF DRAWINGS

FIG. 5 is a block diagram showing an arrangement of an embodiment in which a data recording apparatus according to the present invention is applied to a data recording apparatus for inserting and editing an audio data (hereinafter referred to as a data recording apparatus according to the embodiment);

FIG. 6 is a block diagram showing arrangements of a timing controlling means incorporated in a computer for controlling the data recording apparatus according to the embodiment and of an encoding circuit incorporated in the data recording apparatus;

FIG. 12 is a diagram used to explain the disadvantages of the prior art.

BEST MODE FOR CARRYING OUT THE INVENTION

An embodiment in which a data processing apparatus according to the present invention is applied particularly to an audio encoding processing apparatus of an authoring system for editing data to be recorded on a DVD video disk (hereinafter referred as simply to an encoding apparatus according to this embodiment) will be described with respect to FIGS. 1 to 9.

Before an encoding apparatus 1 according to this embodiment being described, an arrangement and a timing of an audio data handled by the encoding apparatus according to this embodiment will be described.

Figure 1:
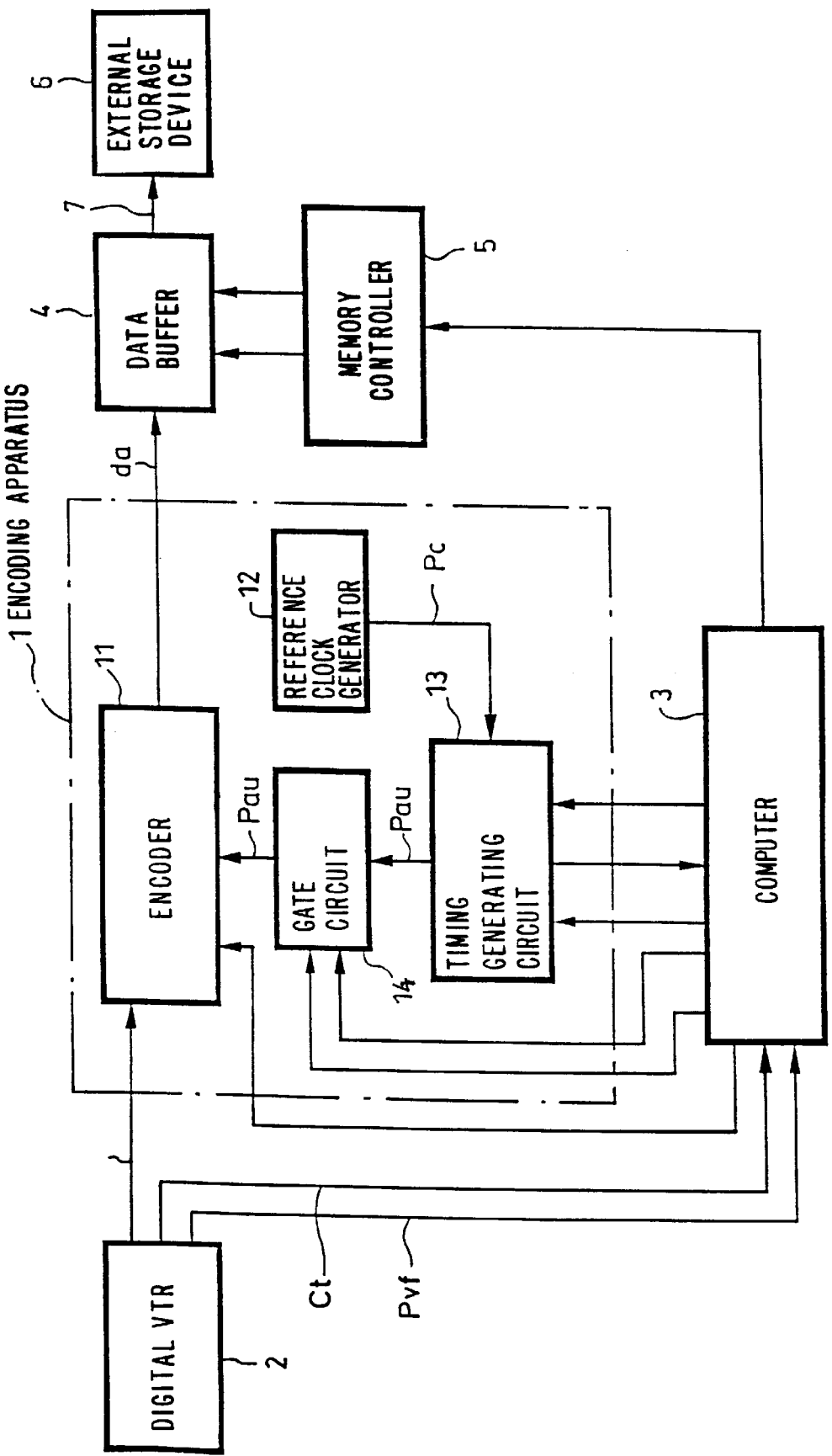
FIG. 1 is a block diagram showing an arrangement of an embodiment in which a data processing apparatus according to the present invention is applied to, particularly, an audio encoding apparatus of an authoring system for editing data to be recorded on a DVD (digital video disk) (hereinafter referred to as an encoding apparatus according to the embodiment)

As shown in FIG. 1, an audio data is an audio data Da from a digital VTR 2 for reproducing an audio data and a video data recorded on a magnetic tape, for example. Particularly, the digital VTR 2 outputs time information indicative of a count value of a frame or a field of the video data (i.e., a time code Ct) and a pulse signal Pvf indicative of an output timing (output start point) thereof.

Usually, the digital VTR 2 has audio output terminals of the large number of channels (e.g., 8 channels), and outputs the audio data Da from all the audio terminals to an encoding apparatus in parallel. Therefore, an encoding apparatus 11 thereof is input with the audio data Da of 8 channels in parallel and encodes these audio data Da of 8 channels at the same time. However, in order to simply describe the arrangement and timing of the audio data Da, the arrangement and timing thereof will hereinafter be described on the assumption that there is the audio data Da of one channel amount and that a timing for counting the time code Ct is synchronized with the frame of the video data. Accordingly, the pulse signal Pvf indicative of the output start point of the time code Ct will hereinafter be referred to as a video frame pulse.

The above audio data Da is formed of successive data sampled with a predetermined sampling frequency. One sampling data is formed of 16 bits, for example.

The encoding apparatus 1 employs an encoding algorithm according to the MPEG/audio (Layer II type) standard, for example. As a result, an audio frame Cau which is an encoding processing unit of this encoding apparatus 1 is formed of 1152 samples (1152 sampling data). Therefore, relationship between the audio frame and the audio sample is expressed by the following equation 1.

1 audio frame=1152 samples

As shown in FIG. 1, the encoding apparatus 1 of this embodiment has the encoder 11 for encoding the audio data Da from the digital VTR 2 by an audio frame unit in accordance with an algorithm of the MPEG/audio standard under the control of a computer 3, a reference clock generator 12 for generating a reference clock Pc with reference to a frequency (sampling frequency) Fs of the audio sample, and a timing generating circuit 13 for outputting an audio frame pulse Pau indicative of a start point of the audio frame under the control of the computer 3 and based on input of the reference clock Pc and so on.

The encoding apparatus 1 has a gate circuit 14 connected between the encoder 11 and the timing generating circuit 13. The gate circuit 14 is a circuit for stopping supplying the audio frame pulse Pau output from the timing generating circuit 3 to the encoder 11 based on input of a pulse-supply stop signal from the computer 3 and for starting supplying the audio frame pulse Pau output from the timing generating circuit 3 to the encoder 11 based on input of a pulse-supply start signal from the computer 3.

The encoder 11 encodes the audio data Da based on the input of the audio frame pulse Pau from the timing generating circuit 13 and outputs it as an encoded data da to a data buffer 4 at the succeeding stage. An operation of storing the encoded data da in the data buffer 4 is carried out in accordance with a writing control of a memory controller 5 operated under the control of the computer 3.

The encoded data da stored in the data buffer 4 is output to an external storage device 6 (such as a hard disk or the like), for example, under the read control of the memory controller 5. The external storage device 6 successively stores the encoded data da transmitted thereto from the data buffer 4 through a data bus 7 at its physical address corresponding to a head logical address input thereto from the memory controller 5 through an address bus.

The computer 3 incorporates therein a means for controlling the encoder 11, a means (a timing control means 21) for controlling the timing generating circuit 13 and so on as a hardware or a software.

Figure 2:
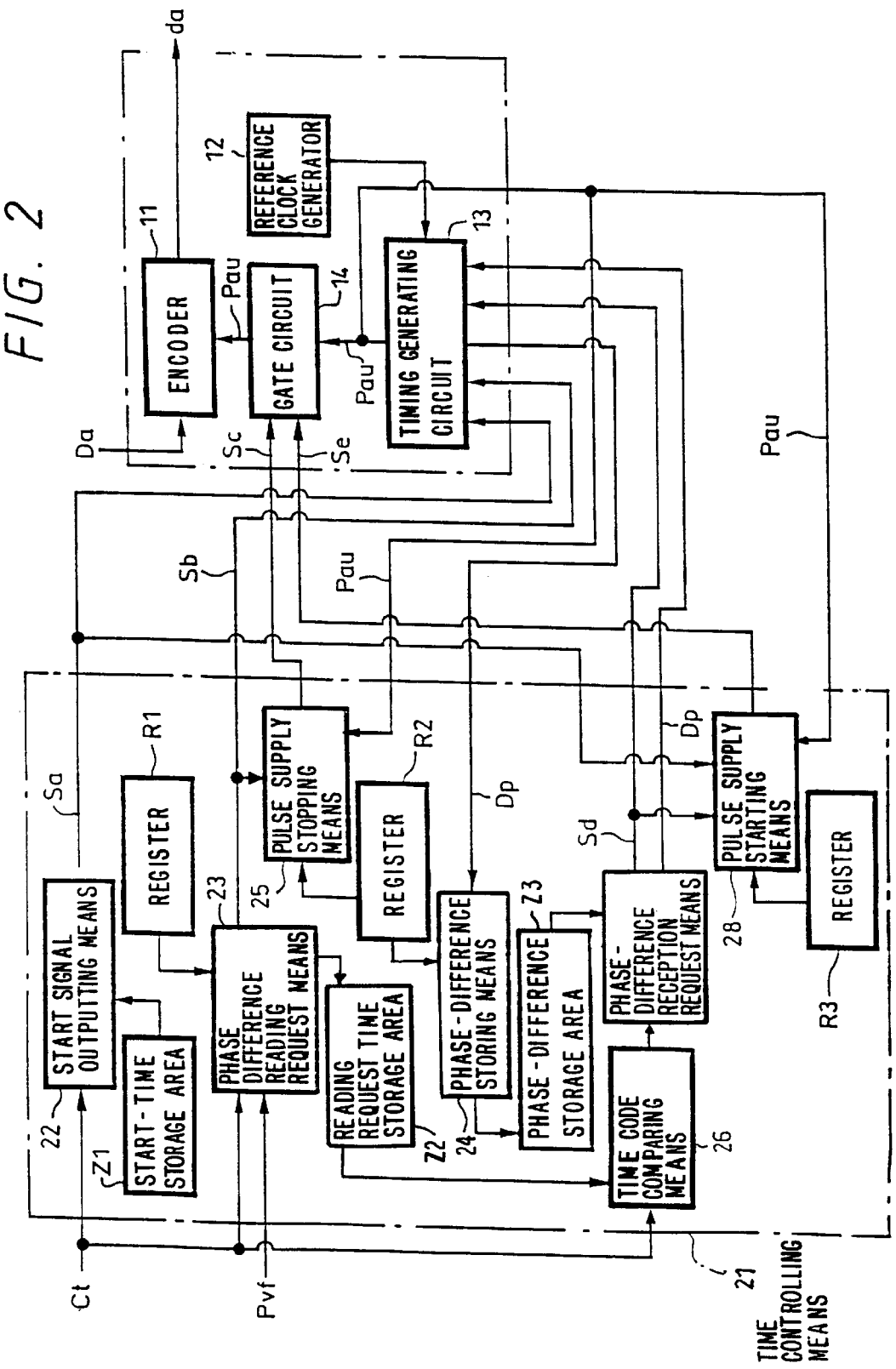
FIG. 2 is a block diagram showing arrangements of a timing controlling means and the encoding apparatus incorporated in a computer for controlling the encoding apparatus according to the embodiment.

The timing controlling means 21, as shown in FIG. 2, for example, has a start-signal outputting means 22, a phase-difference reading request means 23, a phase-difference storing means 24, a switch point pulse supply stopping means 25, a time code comparing means 26, a phase-difference reception request means 27 and a switch point pulse supply starting means 28.

The above start-signal outputting means 22 has a function to output a start signal Sa to the timing generating circuit 13 when a time indicated by a time code Ct transmitted from the digital VTR 2 after the digital VTR 2 reproduces, for example, a first magnetic tape is a set start time. The start time is one which an operator inputs by operating a key inputting means, for example. This time data is stored in a predetermined area (start-time storage area Z1) of a data RAM.

Figure 3:
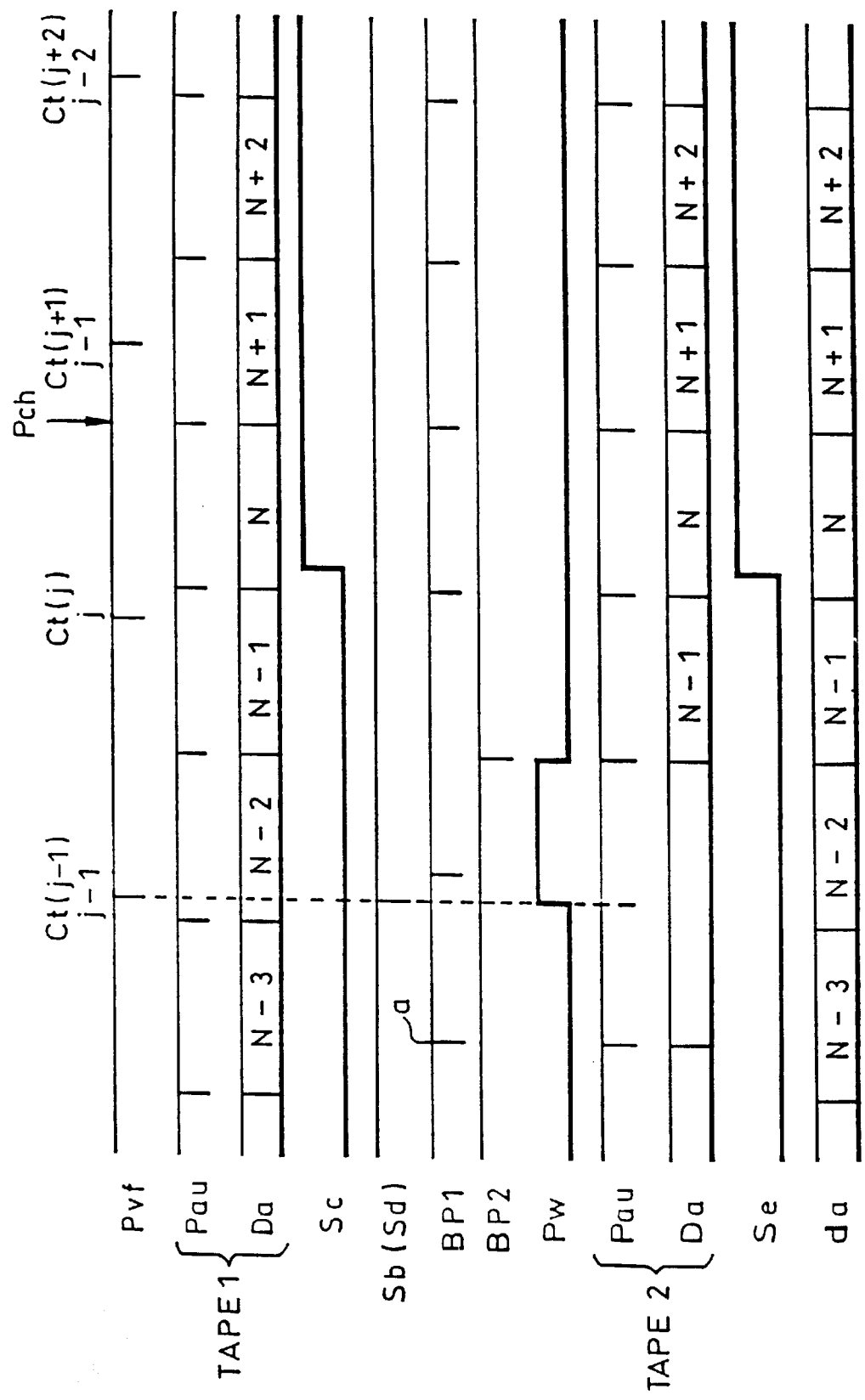
FIG. 3 is a timing chart showing a signal processing of the timing controlling means and the encoding apparatus.

The phase-difference reading request means 23 has a function to count the number of video frame pulses Pvf input from the digital VTR 2, to then store a present time code Ct in a predetermined area (reading request time storage area Z2) of the data RAM when a count value becomes a predetermined count value, e.g. a count value one video frame pulse amount prior to a count value (j) at a point Pch when a tape is changed to another magnetic tape in an example shown in FIG. 3 (a count value of (j−1) stored in a register R1 allocated in the computer 3), and to output a phase-difference reading request signal Sb to the timing generating circuit 13.

The phase-difference storing means 24 has a function to store a value output from the timing generating circuit 13 based on the phase-difference reading request signal Sb input from the above phase-difference reading request means 23 as a phase-difference value Dp in a predetermined area (phase-difference storage area Z3) of the data RAM.

The switch-point pulse supply stopping means 25 has a function to start counting the audio frame pulses Pau based on the phase-difference reading request signals Sb input from the phase-difference reading request means 23 and to output a pulse supply stop signal Sc to the gate circuit 14 when the count value becomes a predetermined value k, thereby stopping the supply of the audio frame pulse Pau to the encoder 11 from the timing generating circuit 13.

The predetermined value k is set "2", for example, in this embodiment. This value h is stored in a register R2 allocated in the computer 3. In the example shown in FIG. 3, since the phase-difference reading request signal Sb is output in the middle of an audio frame (N−2) of data reproduced from the first magnetic tape, for example, the pulse supply stopping means 25 counts the respective audio frame pulses Pau of the audio frames (N−1) na d(N) and then outputs the pulse supply stop signal Sc. In accordance with this processing, the encoder 11 will not encode the audio data Da from the audio frame (N+1) of the data (audio data Da) reproduced from the first magnetic tape.

The time code comparing means 26 has a function to compare the time code Ct transmitted from the digital VTR 2 after the digital VTR reproduces a switched magnetic tape with a time code stored in the reading request time storage area Z2 of the data RAM and to output a result of the comparison to the phase-difference reception request means 27 at the succeeding stage.

The phase-difference reception request means 27 has a function to output the phase-difference reception request signal Sd to the timing generating circuit 13 when the comparison result from the time code comparing means 26 indicates coincidence and to subsequently output the phase-difference value Dp stored in the phase-difference storage area Z3 of the data RAM to the timing generating circuit 13. The timing generating circuit 13 opens a gate for a data input, for example, based on the phase-difference reception request signal Sd input from the phase-difference reception request means 27, to receive the phase-difference value Dp input thereto subsequently, and to start counting from a count value indicated by the phase-difference value Dp.

The pulse-supply starting means 28 has a function to count the audio frame pulses Pau based on the phase-difference reception request signal Sd input from the phase-difference reception request means 27 and to output the pulse supply start signal Se to the gate circuit 14 when the count value becomes a predetermined value h, thereby starting the supply of the audio frame pulses Pau from the timing generating circuit 13 to the encoder 11.

The predetermined value h is set to "2", for example, in this embodiment. The value h is stored in the register R3 allocated in the computer 3, for example. Accordingly, in the example shown in FIG. 3, since being input with the phase-difference reading reception signal Sd at the middle of an audio frame (N−2) of a data reproduced from a second magnetic tape, for example, the pulse supply starting means 28 counts respective pulses of the audio frames (N−1) and (N) and then outputs the pulse supply start signal Se. Therefore, the encoder encodes the audio data Da after the audio frame (N+1) of the data (audio data Da) reproduced from the second magnetic tape.

The timing generating circuit 13 is formed mainly of a counter which counts the reference clock Pc from the reference clock generator 12 and outputs one pulse signal (audio frame pulse Pau) every time when counting the sample value of the audio frame (i.e., 1152 in this case). The timing generating circuit 13 supplies the audio frame pulse Pau to the encoder 11 and the computer 3.

The encoder 11 encodes the audio data Da supplied from the digital VTR 2 in synchronization with the input timing of the audio frame pulse Pau from the timing generating circuit 13 and then outputs it as the encoded data da. The encoded data da is written in the data buffer 4 at the succeeding stage under the writing control of the memory controller 5.

The timing generating circuit 13 starts counting the reference clock Pc from the reference clock generator 12 based on the input of the start signal Sa from the start-signal outputting means 22 of the timing controlling means 21 and, as described above, then outputs the audio frame pulse Pau when the count value becomes a predetermined count value (1152 samples).

Thereafter, the timing generating circuit 13 outputs a current count value (phase-difference value Dp) to the computer 3 based on the input of the phase-difference reading request signal Sb from the phase-difference reading request means 23 of the timing controlling means 21.

The count value Dp is a count value of the reference clock from an output point of the audio frame pulse predetermined-amount prior to an output point (e.g., a (N+1)th frame in the example shown in FIG. 3) of an audio frame pulse at a point Pch when the digital VTR 2 changes the magnetic tapes, i.e., an output point of an audio frame pulse Pau immediately preceding to an output point of a video frame pulse two audio frame pulse prior to the switch point Pch to an input point of the phase-difference reading request signal Sb. This value represents a phase difference between the audio frame pulse Pau previously input by a predetermined amount and the video frame pulse Pvf (j−1) at the input point of the phase-difference reading request signal Sb or a phase difference between a video frame pulse Pvf (j−1) at the input point of the phase-difference reading request signal Sb and an audio frame pulse Pau (N−1) next to an audio frame pulse Pau (N−2) previously input by a predetermined amount.

The timing generating circuit 13 receives, based on the input of the phase-difference reception request signal Sd from the phase-difference reception request means 27 of the timing controlling means 21, the phase-difference value Dp (count value) transmitted from the phase-difference reception request means 27 and changes the current count value to the received phase-difference value Dp, thereby starting counting from the above phase-difference value Dp.

Processings of the timing controlling means 21 of the computer 3 and the timing generating circuit 13, particularly processings carried out when the digital VTR 2 reproduces the second magnetic tape after reproducing the first magnetic tape will be described with reference to -timing charts shown in FIG. 3.

A start time and an end time are input through the key input device connected to the computer 3 initially. Especially, the start time is stored in the start-time storage area Z1 of the data RAM. At this time, the computer outputs a stand-by request signal to the digital VTR 2, and the digital VTR 2 starts an operation of reproducing the first magnetic tape based on the input of the stand-by request signal from the computer 3.

When the digital VTR 2 starts reproducing the first magnetic tape, the digital VTR 2 outputs the audio data Da and further outputs the time code Ct and the video frame pulse Pvf both of which are synchronized with the video frame.

The time code Ct output from the digital VTR 2 is supplied to the start-signal outputting means 22, the phase-difference reading request means 23 and the time code comparing means 26 of the timing controlling means 21. The video frame pulse Pvf output from the digital VTR 2 is supplied to the phase-differ ence reading request means 23.

The start-signal outputting means 22 outputs the start signal Sa to the timing generating circuit 13 when a time indicated by the supplied time code Ct becomes the start time stored in the start-time storage area Z1.

The timing generating circuit 13 starts counting the reference clock Pc from the reference clock generator 12 based on the input of the above start signal Sa from the computer 3. The timing generating circuit 13 can count in the range from "1" to "1152" and therefore counts such that when the count value reaches "1152", then the count value returns to "1". Then, every time when the count value becomes "1", the timing generating circuit outputs one audio frame pulse Pau. Therefore, at a point when the timing generating circuit 13 is input with the start signal Sa, the timing generating circuit outputs one audio frame pulse Pau. Thereafter, every time when the timing generating circuit counts the 1152 reference clocks Pc, the timing generating circuit outputs one audio frame pulse Pau.

Thus, the timing generating circuit 13 successively outputs the audio frame pulse Pau and supplies it to the encoder 11 and the computer 3. It is through the gate circuit 14 that the audio frame pulse Pau is supplied to the encoder 11. In this case, since the gate circuit 14 is not input with the pulse supply stop signal Sc from the computer 3, the gate circuit supplies the audio frame pulse Pau from the timing generating circuit 13 to the encoder 11 as it is.

The encoder 11 starts its encoding processing by setting the input point of the audio frame pulse Pau output from the timing generating circuit 13 as its start point for encoding the audio data Da. Specifically, the encoder 11 divides the audio data Da successively output from the digital VTR 2 by a unit of 1152 samples and then encodes the audio data unit by unit. The encoded data (encoded data da) is successively written in the data buffer 4 under the writing control of the memory controller 5.

When the digital VTR 2 finishes the processing of reproducing the first magnetic tape, i.e., when the count value of the video frame pulse Pvf counted by the phase-reference reading request means 23 of the computer 3 becomes the predetermined count value stored in the register R1 (a value of (j−1) in the example shown in FIG. 3), the phase-difference reading request means 23 outputs the phase-difference reading request signal Sb to the timing generating circuit 13 and at the same time stores the current time code (time code Ct of (j−1) in the example shown in FIG. 3) in the reading request time storage area Z2 of the data RAM.

The timing generating circuit 13 outputs the current count value (phase-difference value Dp0) to the computer 3 based on the input of the phase-difference request signal Sb output from the phase-difference reading request means 23. The phase-difference value Dp transmitted from the timing generating circuit 13 is supplied through the phase-difference storing means 24 of the timing controlling means 21 to the phase-difference storage area Z3 of the data RAM and then stored therein.

At this time, the pulse-supply stopping means 25 of the timing controlling means 21 counts the audio frame pulse Pau based on the input of the phase-difference reading request signal Sb output from the phase-difference reading request means 23 and outputs the pulse supply stop signal Sc to the gate circuit 14 when the count value reaches the predetermined value k stored in the register R2.

The gate circuit 14 stops supplying the audio frame pulse Pau to the encoder 11, based on the input of the pulse-supply stop signal Sc from the computer 3. From this point, the encoder 11 stops its processing for encoding the audio data (Da). In the example shown in FIG. 3, when counting the audio frame pulse Pau (N) of the audio frame (N), the pulse supply stopping means 25 outputs the pulse-supply stop signal Sc. Therefore, the encoder 11 will not encode the audio data Da after the audio frame (N+1).

After the operation of encoding the audio data Da reproduced from the first magnetic tape is finished, the second magnetic tape is loaded onto the digital VTR 2 and then the second magnetic tape is reproduced. The digital VTR 2 outputs data (audio data Da) reproduced from the second magnetic tape, the time code Ct and the video frame pulse Pvf thereof.

The time code comparing means 26 of the timing controlling means 21 of the computer 3 compares the time code Ct from the digital VTR 2 with the time code stored in the phase-difference reading time storage area Z2 of the data RAM. The time code comparing means supplies a result of this comparison to the phase-difference reception request means 27. The phase-difference reception request means 27 outputs the phase-difference reception request signal Sd to the timing generating circuit 13 when the result of the comparison from the time code comparing means 26 indicates coincidence of both values, i.e., when the time code Ct from the digital VTR 2 reaches the time code Ct (j−1) in the example shown in FIG. 3, and then outputs the phase-difference data stored in the phase-difference storage area Z3 of the data RAM to the timing generating circuit 13.

The timing generating circuit 13, based on the input of the phase-difference reception request signal Sd from the computer 3, opens a gate for supplying data to the timing generating circuit 13 and fetches the phase-difference value Dp subsequently input from the computer 3, starting the counting operation from the phase-difference value Dp.

The phase-difference value Dp is a count value from the audio frame (N−1) of the audio data Da from the first magnetic tape to the video frame (j−1) at the time code Ct (j−1). Therefore, when the timing generating circuit 13 starts counting the reference clock Pc from the phase-difference value Dp, a time from the counting start point to a change point from "1152" to "1" is equal to a time from a start point of the video frame (j−1) starting from the time code Ct (j−1) to a point where the audio frame is changed to the audio frame (N−1).

Specifically, it means that the phase difference equivalent to the one from the start point of the video frame (j−1) of the data reproduced from the first magnetic tape to the start point of the audio frame (N−1) is reproduced in the data reproduced from the second magnetic tape.

As a result, when the data reproduced from the second magnetic tape is encoded, a timing of outputting the audio frame pulse Pau after the output of the video frame pulse Pvf corresponding to the time code Ct (j−1) is synchronized with a timing of outputting the audio frame pulse Pau used in the processing of encoding the data reproduced from the first magnetic tape.

Therefore, if the encoder 11 starts encoding the data reproduced from the second magnetic tape from the audio frame (N+1), then the encoded data da after the audio frame (N+1) continuously succeeds the encoded data of the (N)th audio frame corresponding to the data reproduced from the first magnetic tape.

The pulse-supply starting means 28 of the timing controlling means 21 of the computer 3 starts counting the audio frame pulse Pau from the timing generating circuit 13 based on the phase-difference reception request signal Sd from the phase-difference reception request means 27. When the count value reaches the predetermined value h stored in the register R3, then the pulse-supply starting means 28 outputs the pulse-supply start signal Se. In the example shown in FIG. 3, when being supplied with the audio frame (N), the pulse-supply starting means outputs the pulse-supply start signal Se to the gate circuit 14.

When the digital VTR 2 finishes the reproduction of the first magnetic tape (after the start of the audio frame (N)), the gate circuit 14 is supplied with the pulse-supply stop signal Sc output through the pulse-supply stop means 25. Therefore, the audio frame pulse Pau output from the timing generating circuit 13 is stopped being supplied to the encoder 11.

When the pulse-supply start signal Se output through the pulse-supply starting means 28 is input to the gate circuit 14 in such state, a state of stopping supplying the audio frame pulse Pau to the encoder 11 is released. Therefore, the encoder 11 is supplied with the audio frame pulse Pau after the audio frame (N+1) of the data reproduced from the second magnetic tape, and hence the encoder 11 encodes the data reproduced from the second magnetic tape from the audio frame (N+1).

Specifically, after outputting the encoded data da up to the audio frames (0) to the audio frame (N) of the data reproduced from the first magnetic tape, the encoder 11 outputs the encoded data da after the audio frame (N+1) of the data reproduced from the second magnetic tape.

In this case, since the start timing of the processing of encoding the data reproduced from the second magnetic tape (audio frame pulse Pau) is synchronized with the start timing of the processing for encoding the data reproduced from the first magnetic tape (audio frame pulse Pau), the audio frame (N+1) from the second magnetic tape continuously succeeds the audio frame (N) from the first magnetic tape.

The processing of encoding data reproduced from a third magnetic tape or the succeeding magnetic tapes is encoded similarly as described above. In this case, the audio frames are continuously jointed at each of the switch points.

Subsequently, a specific arrangement of the timing generating circuit 13 will be described with reference to FIG. 4, by way of example. The timing generating circuit 13 has two counters (first and second counters 31, 32) and an inhibit circuit 33.

The first counter 31 is a circuit for starting counting the reference clock Pc from the reference clock generator 12 based on the input of the start signal Sa from the computer 3. The first counter counts the reference clock within the range from "1" to "1152" and such that the value returns to "1" after "1152". Every time when the count value becomes "1", the first counter outputs one reference pulse BP1 and supplies it to the inhibit circuit 33.

The first counter 31 outputs a current count value as the phase-difference value Dp to the computer 3 based on the input of the phase-difference reading request signal Sb from the computer 3.

The second counter 32 is a circuit for, based on the input of the phase-difference reception request signal Sd from the computer 3, fetching the phase-difference value Dp from the computer 3 and starting counting the reference clock Pc from the phase-difference value Dp. The second counter counts the reference clock within the range from "1" to "1152" similarly to the first counter and such that the value returns to "1" after "1152". When the count value becomes "1", the second counter outputs one reference pulse BP2.

When outputting one reference pulse BP1, the second counter 32 finishes its counting operation and then stops the counting operation until it is input with the phase-difference reception request signal Sd from the computer 3. The second counter 32 is connected to the first counter 31 and the inhibit circuit 33 such that the one reference pulse BP2 output therefrom is supplied through a contact a to the first counter 31 and further supplied through a contact b to the inhibit circuit 33.

The inhibit circuit 33 has a window pulse generating circuit 34 for outputting a window pulse Pw set at high level during only a certain period and a gate circuit 35 for inhibiting the output of the reference pulse BP1 or BP2 only during a period when the window pulse Pw from the window pulse generating circuit 34 is at high level.

The window pulse generating circuit 34 is formed of, for example, an SR flip flop and connected such that the phase-difference reception request signal Sd is input to its set terminal S and the reference pulse BP2 from the second counter 32 is input to its reset terminal R.

The gate circuit 35 is formed of, for example, an OR circuit of two-terminal input type and connected such that the reference pulse BP1 or BP2 from the first counter 31 or the second counter 32 is input to one input terminal and the window pulse Pw output from an output terminal Q of the window pulse generating circuit 34 is input to the other input terminal. Hereinafter, in view of convenience, the gate circuit 35 is referred to as the OR circuit 35 for distinguishing it from the gate circuit 14 for controlling the supply of the audio frame pulse Pau to the encoder 11.

Necessity of the inhibit circuit 35 lies in that if the reference pulses BP1 and BP2 respectively output from the first counter 31 and the second counter 32 are set as the audio frame pulse Pau as they are, as shown in FIG. 3, since the first count 31 continuously counts the reference clock Pc from the output point (shown by an arrow a) of the reference pulse BP1 before it is input with the phase-difference reception request signal Sd from the computer 3, the first counter 31 outputs the reference pulse BP1 when the count value returns to "1" after it is input with the phase-difference reception request signal Sd, for example, and then the second counter 32 outputs the reference pulse BP2 at a shorter interval than the audio frame length.

This results from the fact that the first counter 31 starts its counting operation regardless of the video frame of the data reproduced from the second magnetic tape and the second counter 32 starts its counting operation in synchronization with the audio frame of the data reproduced from the first magnetic tape. Therefore, it can occur that the first counter 31 outputs the reference pulse BP1 between the input point of the phase-difference reception request signal Sd and the output point of the reference pulse BP2 from the second counter 32.

In this case, if the reference pulse BP1 output from the first counter 31 in the above period is set as the audio frame pulse Pau as it is, then a certain one of intervals between the audio frame pulses Pau becomes shorter than the period of the audio frame, which may lead to disadvantage in the encoding processing of the encoder 11.

Since in this embodiment the gate circuit 14 controls the supply of the audio frame pulse Pau to the encoder 11 so that the data reproduced from the second magnetic tape should be encoded after the switch point, it seems that no problem occurs. However, since the pulse-supply starting means 28 of the timing controlling means 21 of the computer 3 finishes its counting operation at an audio frame (after start of the audio frame (N−1) in the example shown in FIG. 3) one-audio-frame prior to the predetermined switch point, the switch point is employed as the start point of the audio frame (N) and consequently the encoded data of the audio frame (N) may be produced from the both of the data reproduced from the first and second magnetic tapes.

Therefore, in this embodiment, the inhibit circuit 33 is provided to inhibit the output of the reference pulse BP1 to be output from the input point of the phase-difference reception request signal Sd to the output point of the reference pulse BP2 from the second counter 32, and the reference pulse output from the inhibit circuit 33 is input as a real audio frame pulse Pau to the encoder 11 and the computer 3.

A signal processing of the timing generating circuit 13 according to a modified example of the present invention will be described with reference to FIG. 3 as well as other drawings. The processing of the timing controlling means 21 incorporated in the computer 3 has already been described and hence will not be described.

The first counter 31 starts counting the reference clock Pc from the reference clock generator 12 based on the input of the start signal Sa from the start-signal outputting means 22 of the timing controlling means 21 incorporated in the computer 3 and outputs one reference pulse BP1 every time when the count value returns to "1".

Therefore, the first counter 31 outputs one reference pulse BP1 when it is input with the start signal Sa and thereafter outputs one reference pulse BP1 every time when it counts the 1152 reference clocks Pc. The reference pulse BP1 is a negative-polarity pulse signal having a front edge at a point where its level is changed from a high level to a low level and a rear edge at a point where its level is changed from a low level to a high level.

The first counter 31 outputs the reference pulse BP1 to one input terminal of the OR circuit 35 at the succeeding stage. In this state, since, when the window pulse generating circuit 34 is not input with the phase-difference reception request signal Sd, the window pulse Pw output from the window pulse generating circuit 34 is at low level, the signal output form the OR circuit 35 is the reference pulse BP1 itself which is supplied as the audio frame pulse Pau to the encoder 11 and the computer 3.

It is through the gate circuit 14 that the audio frame pulse Pau is supplied to the encoder 11. In this case, since the gate circuit 14 is not input with the pulse-supply stop signal Sc from the computer 3, the audio frame pulse Pau from the OR circuit 35 is supplied to the encoder 11 as it is.

The encoder 11 starts the encoding operation by employing the input point of the audio frame pulse Pau output from the OR circuit 35 as the start point for the operation for encoding the audio data Da. Specifically, the encoder divides the audio data successively output from the digital VTR by a unit of 1152 samples and then encodes them. The data (encoded data da) subjected to the encoding processing are successively written in the data buffer 4 under the writing control of the memory controller 5.

When the digital VTR 2 finishes its processing for reproducing the first magnetic tape, i.e., when the count value of the video frame pulse Pvf counted by the phase-difference reading request means 23 of the computer 3 becomes a count value ((j−1) in the example shown in FIG. 3) obtained by subtracting 1 from the count value of the video frame pulse at the point when the first magnetic tape is exchanged for the second magnetic tape, the phase-difference reading request means 23 outputs the phase-difference reading request signal Sb to the first counter 31 and at the same time stores the current time code (the time code Ct (j−1) in the example shown in FIG. 3) in the reading request time storage area Z2 of the data RAM.

The first counter 31 outputs the current count value as the phase-difference value Dp to the computer 3 based on the input of the phase-difference reading request signal Sb output from the phase-difference reading request means 23. The phase-difference value Dp output from the first counter 31 is supplied through the phase-difference storing means 24 to the data RAM and then stored in the phase-difference storage area Z3 thereof.

At this time, the pulse-supply stopping means 25 counts the audio frame pulse Pau output from the OR circuit 35 based on the input of the phase-difference reading request signal Sb output from the phase-difference reading request means 23 and outputs the pulse-supply stop signal Sc to the gate circuit 14 when the count value reaches the predetermined count value k stored in the register R2.

The gate circuit 14 stops supplying the audio frame pulse Pau to the encoder 11 based on the pulse-supply stop signal Sc from the computer 3. From this point, the encoder 11 stops encoding the audio data Da. In the example shown in FIG. 3, when the pulse-supply stop means counts the audio frame pulse Pau of the audio frame (N), the pulse-supply stopping means 25 outputs the pulse-supply stop signal Sc. Therefore, the encoder will not encode the audio data after the audio frame (N+1).

After the encoder finishes the processing of encoding the audio data from the first magnetic tape, the digital VTR 2 is loaded with the second magnetic tape and reproduces the second magnetic tape. Then, the digital VTR 2 outputs the data (audio data Da) reproduced from the second magnetic tape, the time code Ct thereof and the video frame pulse Pvf thereof.

If the result of comparison carried out by the time code comparing means 26 of the timing controlling means 21 indicates coincidence between both of the time codes, i.e., if the time code Ct from the digital VTR 2 becomes the time code Ct (j−1) in the example shown in FIG. 3, the phase-difference reception request means output the phase-difference reception request signal Sd to the second counter 32 and the window pulse generating circuit 34 and then outputs the phase-difference value Dp stored in the phase-difference storage area z3 of the data RAM to the second counter 32.

The second counter 32, based on the input of the phase-difference reception request signal Sd from the computer 3, opens the gate for supplying the data to the second counter 32, fetches the phase-difference value Dp input from the computer 3, and then start counting the value from the phase-difference value Dp. This second counter outputs one reference pulse BP2 when the counter value returns to "1" from "1152" and then stops the counting operation.

The window-pulse generating circuit 34 outputs the window pulse Pw which rises at the input point of the phase-difference reception request signal Sd and falls at the input point of the reference pulse BP2 from the second counter 32. The window pulse Pw is supplied to the other input terminal of the OR circuit 35. Therefore, during a period when the window pulse Pw is at high level, the output from the OR circuit 35 is set at high level and hence even if the reference pulse BP1 from the first counter 31 is output as it is from the OR circuit, it is substantially ineffective. Specifically, the reference pulse BP1 from the first counter 31 during the above period is not output as the audio frame pulse Pau.

Since the phase-difference value Dp is a count value from the audio frame (N−1) of the audio data from the first magnetic tape to the video frame (j−1) of the time code Ct (j−1), if the second counter 32 starts counting the reference clock Pc from the phase-difference value Dp, when a time from the counting start point to a point where the count value is changed from "1152" to "1" becomes equal to a time from the start point of the video frame (j−1) corresponding to the time code Ct (j−1) of the data reproduced from the first magnetic tape to a point when the audio frame is changed to the audio frame (N−1).

Specifically, it means that the phase difference equivalent to the one from the start point of the video frame (j−1) of the data reproduced from the first magnetic tape to the start point of the audio frame (N−1) is reproduced in the data reproduced from the second magnetic tape.

As a result, when the data reproduced from the second magnetic tape is encoded, a timing of outputting the audio frame pulse Pau after the output of the video frame pulse corresponding to the time code Ct (j−1) is synchronized with a timing of outputting the audio frame pulse Pau used in the processing of encoding the data reproduced from the first magnetic tape.

Therefore, if the encoder 11 starts encoding the data reproduced from the second magnetic tape from the audio frame (N+1), then the encoded data after the audio frame (N+1) continuously succeeds the encoded data of the (N)th audio frame corresponding to the data reproduced from the first magnetic tape.

The pulse-supply starting means 28 of the timing means 21 of the computer 3 starts counting the audio frame pulse Pau based on the phase-difference reception request signal Sd from the phase-difference reception request means 27. When the count value reaches the predetermined value h stored in the register R3, then the pulse-supply starting means 28 outputs the pulse-supply start signal Se. In the example shown in FIG. 3, when being supplied with the audio frame (N), the pulse-supply starting means outputs the pulse-supply start signal Se to the gate circuit 14.

When the digital VTR 2 finishes the reproduction of the first magnetic tape (after the start of the audio frame (N)), the gate circuit 14 is supplied with the pulse-supply stop signal Sc output through the pulse-supply stop means 25. Therefore, the audio frame pulse Pau output from the timing generating circuit 13 is stopped being supplied to the encoder 11.

When the pulse-supply start signal Se output through the pulse-supply starting means 28 is input to the gate circuit 14 in such state, a state of stopping supplying the audio frame pulse Pau to the encoder 11 is released. Therefore, the encoder 11 is supplied with the audio frame pulse Pau after the audio frame (N+1) of the data reproduced from the second magnetic tape, and hence the encoder 11 encodes the data reproduced from the second magnetic tape from the audio frame (N+1).

Specifically, after outputting the encoded data from the audio frames (0) up to the audio frame (N) of the data reproduced from the first magnetic tape, the encoder 11 outputs the encoded data da after the audio frame (N+1) of the data reproduced from the second magnetic tape.

In this case, since the start timing of the processing of encoding the data reproduced from the second magnetic tape (audio frame pulse Pau) is synchronized with the start timing of the processing for encoding the data reproduced from the first magnetic tape (audio frame pulse Pau), the audio frame (N+1) from the second magnetic tape continuously succeeds the audio frame (N) from the first magnetic tape.

The processing of encoding data reproduced from a third magnetic tape or the succeeding magnetic tapes is encoded similarly as described above. In this case, the audio frames are continuously jointed at each of the switch points.

While in the above embodiment the digital VTR 2 successively reproduces the audio data Da recorded on a plurality of magnetic tapes one tape by one tape and supplies them to the encoding apparatus 1 according to this embodiment to thereby generate one continuous encoded data string, the present invention can be applied to a data recording apparatus for carrying out an insertion edition of the audio data other than the above reproduction.

In this insertion edition, there is carried out such an edition that a point where a time of two video frame amount has passed after an operator operates a key input means to input data indicative of a start of insertion recording through a key input device is employed as an IN point, and another audio data is inserted from the IN point and that a point where a time of two video frame amount has passed after an operator operates a key input means to input data indicative of an end of insertion recording through a key input device is employed as an OUT point, and insertion of another audio data is stopped from the OUT point. Further, the edited data is encoded and then recorded on a magnetic tape.

A data recording apparatus according to this embodiment will hereinafter be described with reference to FIGS. 5 to 9.

A data recording apparatus 51, as shown in FIG. 5, has a data recording system 52, a data reproducing system 53 and a computer 54 for controlling the data recording system 52 and the data reproducing system 53.

The data recording system 52 has an encoding circuit 61 for encoding input audio data Da by an audio frame unit and outputting them as encoded data da, an error code adding circuit 62 for adding an error correction code to the encoded data da output from the encoding circuit 61, and a recording unit 63 for converting the data output from the error code adding circuit 62 into a signal used to be recorded on a magnetic tape T.

The data reproducing system 53 has a reproducing unit 64 for reproducing the recorded data magnetically recorded on the magnetic tape T and converting the reproduced data into a signal used for a decoding processing at the succeeding stage, an error correcting circuit 65 for error-correcting the reproduced data from the reproducing unit 64, and a decoding circuit 66 for decoding the data from the error correcting circuit 65 to restore it to the audio data Da obtained before the encoding.

A magnetic head, not shown, attached to the data recording apparatus 51 has a preceding reproducing head and a succeeding recording head. When the preceding reproducing head is tracing an nth track, for example, and reproducing data of the nth track, the succeeding recording head traces, for example, an (n−2)th track and records the encoded data transmitted from the preceding stage on the (n−2)th track. One track recorded on the magnetic tape T corresponds to one video frame. If the preceding reproducing head is located at the start point of the nth video frame, then the succeeding recording head is located at the start point of the (n−2)th video frame.

The data recording apparatus 51 has a switching circuit 68 connected between the encoding circuit 61 and the error code adding circuit 62 for selectively switch the encoded data da output from the encoding circuit 61 and an error-corrected data dap output from the error correcting circuit 65 in the data reproducing system 53 based on a control signal Ssw from a switching controlling circuit 67. The data recording apparatus has a delay circuit 69 connected between the switching circuit 68 and the error correcting circuit 65 for matching a reproducing timing and a recording timing with each other, and further has a time code extracting circuit 70 connected between the error correcting circuit 65 and the computer 54 for extracting a time code Ctp from the data output from the error correcting circuit 65.

The switching controlling circuit 67 outputs a switching control signal Ssw having, for example, a high level based on the input of a first switching command signal S8 from the computer 54 and outputs a second switching control signal Ssw having a low level based on the input of a second switching command signal S10.

The switching circuit 68 is formed of a transistor circuit mainly formed of a FET, for example. The switching circuit carries out a switching operation such that it switches data to be supplied to the error code adding circuit 62 at the succeeding stage to the encoded data da from the encoding circuit 61 based on the input of the switching control signal Ssw having a high level from the switching controlling circuit 67 and switches the data to be supplied to the error code adding circuit 62 at the succeeding stage to the error-corrected data dap from the error correcting circuit 65 of the data reproducing system 53 based on the input of the switching control signal Ssw having a low level from the switching controlling circuit 67.

Since a track traced by the preceding reproduction head precedes to a track traced by the succeeding recording head by an amount of two tracks, a delay time produced by the delay circuit 69 is set to a delay time required for recording the data reproduced by the preceding reproducing head on the same track of the magnetic tape T.

Figure 8:
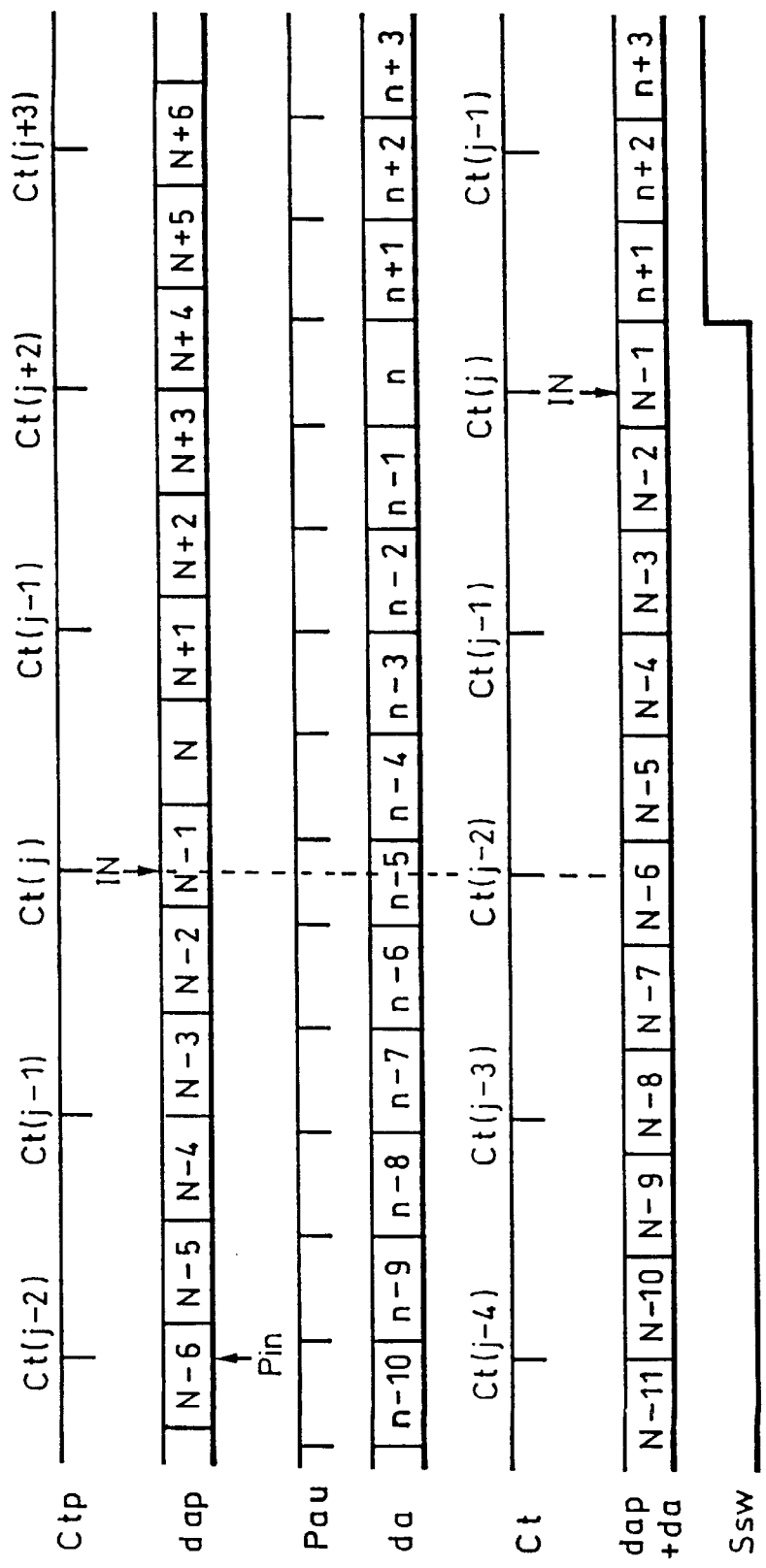
FIG. 8 is a timing chart showing a signal processing at an IN point of the insertion edition of the data recording apparatus according to the embodiment.

Therefore, in an example shown in FIG. 8, since the error corrected data from the delay circuit and to be returned to the recording system is set as a data whose phase is delayed by an amount of two video frames as compared with the reproduced data from the data reproducing system (the reason for this is that the trace position of the succeeding recording head is located at a position which is delayed by an amount of two video frames as compared with a trace position of the preceding reproducing head), at a point when the time code from the time code extracting circuit of the data reproducing circuit is a time code Ct (j) indicative of an IN point, the error-corrected data at the time code Ct (j−2) is returned to the data recording system.

The encoding circuit 61, as shown in FIG. 6, has substantially the same arrangement as the arrangement shown in FIG. 1 and has an encoder 81 for encoding an audio data Da input from the outside by an audio frame unit in accordance with an algorithm of the MPEG/audio standard under the control of the computer 54, a reference clock generator 82 for generating a reference clock Pc set in accordance with a frequency FS of an audio sample (sampling frequency), a timing generating circuit 83 for outputting an audio frame pulse Pau indicative of a start point of an audio frame under the control of the computer 54 and based on the input of the reference clock Pc or the like, and a time code adding circuit 84 for adding a time code Ct to the encoded data da output from the encoder 81.

The computer 54 has as a hardware or a software a means for controlling the encoder 81 provided in the encoding circuit 61, a means (timing controlling means 91) for controlling the timing generating circuit 83, and so on.

The timing controlling means 91 has, as shown in FIG. 6, for example, a start-signal outputting means 92, an IN-point phase-difference reading request means 93, an IN-point phase-difference storing means 94, an OUT-point phase-difference reading request means 95, an OUT-point phase-difference storing means 96, an edition start signal outputting means 97, an IN-point time code comparing means 98, an IN-point phase-difference reception request means 99, a first switching command means 100, an OUT-point phase-difference reception request means 102, and a second switching command means 103.

The start-signal outputting means 92 has a function to output a start signal S1 to the timing generating circuit 83 of the encoding circuit 61 when a time indicated by the time code Ct transmitted from the outside together with the audio data Da indicates a set start time. The start time is input by an operator's operating a key input device, and this time data is stored in a predetermined area (start-time storage area Z11) of a data RAM.

The IN-point phase-difference reading request means 93 has a function to, when a key input interruption signal S2 indicative of a start of an insertion recording is input from the key input means, store the time code Ct supplied at present thereto from the outside in a predetermined area (IN-point time storage area Z12) of the data RAM and to simultaneously output an IN-point phase-difference reading request signal S3 to the timing generating circuit 83 of the encoding circuit 61.

The IN-point phase-difference storing means 94 has a function to store a count value output from the timing generating circuit 83 of the encoding circuit 61 as an IN-point phase-difference value Dp1 in a predetermined area (IN-pint phase-difference storage area Z13) of the data RAM based on the input of the IN-point phase-difference reading request signal S2 from the IN-point phase-difference reading request means 93.

The OUT-point phase-difference reading request means 95 has a function to, when being input with a key input interruption signal S4 from the key input means indicative of an end of the insertion recording, store the time code Ct output at present from the outside in a predetermined area (OUT-point time storage area Z14) of the data RAM and to simultaneously output an OUT-point phase-difference reading request signal S5 to the timing generating circuit 83 of the encoding circuit 61.

The OUT-point phase-difference storing means 96 stores a count value output from the timing generating circuit 83 of the encoding circuit 61 as an OUT-point phase-difference value Dp2 in a predetermined area (OUT-point phase-difference storage area Z15) of the data RAM based on the input of the OUT-point phase-difference reading request signal S5 from the OUT-point phase-difference reading request means 95.

The edition start signal outputting means 97 has a function to output an edition start signal S6 to the timing generating circuit 83 of the encoding circuit 61 when a time indicated by the time code Ctp input thereto through the time code extracting circuit 70 indicates a set start time. A signal line for the edition start signal S6 is connected at a contact a to a signal line for the start signal S1 output from the start-signal outputting means 92. The edition start signal is a signal equivalent to the start signal S1.

The IN-point time code comparing means 98 has a function to compare the time code Ctp transmitted from the time code extracting circuit 70 with a value obtained by adding a time code stored in the IN-point time storage area Z12 of the data RAM with a value of a two-video-frame amount (i.e., a time code of the IN point), and to further output a result of the comparison to the IN-point phase-difference reception request means 99 at the succeeding stage.

The IN-point phase-difference reception request means 99 has a function to output the IN-point phase-difference reception request signal S7 to the timing generating circuit 83 of the encoding circuit 61 when the comparison result from the IN-point time code comparing means 98 indicates coincidence of both values, and to subsequently output the IN-point phase-difference value Dp1 stored in the IN-point phase-difference storage area Z13 of the data RAM to the timing generating circuit 83.

The timing generating circuit 83 opens a gate for data input, for example based on the input of the IN-point phase-difference reception request signal S7 from the IN-point phase-difference reception request means 99, receives the IN-point phase-difference value Dp1 subsequently input thereto, and starts counting from the IN-point phase-difference value Dp1.

The first switching command means counts the audio frame pulse Pau output from the timing generating circuit 83 based on the input of the phase-difference reception request signal S7 output from the IN-point phase-difference reception request means 99 and then outputs the first switching command signal S8 to the switching controlling circuit 67 of the encoding circuit 61 when the count value reaches a predetermined count value.

In this embodiment, the predetermined count value is set to "6", for example, and stored in a register R11 allocated in the computer 54. Therefore, in the example shown in FIG. 8, since, a point when the IN-point phase-difference reception request means 99 outputs the IN-point phase-difference reception request signal S7 is just a point of the IN point (time code Ct (j)) and is also a point delayed by a two-video-frame amount in the data recording system 52, a point when an audio frame immediately after the IN point appears in the data recording system 52 is a point when six audio frames have passed since an output point of the IN-point phase-difference reception request signal S7.

Therefore, since the first switching command means 100 outputs the first switching command signal S8 when counting six audio frame pulses Pau from the data reproducing system 53 after the IN point, the switching circuit 68 carries out its switching operation at the start point of the audio frame (N) next to the audio frame (N−1) including the IN point of the error-corrected data dap from the delay circuit 69, thereby the data to be supplied to the error code adding circuit 62 at the succeeding stage being switched from the error-corrected data dap to the encoded data da from the encoding circuit 61. In the example shown in FIG. 8, the encoded data da after the audio frame (N+1) from the encoding circuit 61 continuously succeeds the audio frame (N−1) of the error-corrected data dap.

The OUT-point time code comparing means 101 has a function to compare the time code Ctp transmitted from the time code extracting circuit 70 with the value obtained by adding the time code stored in the OUT-point time storage area Z14 of the data RAM with a value of a two-video-frame amount, and to output the comparison result to the OUT-point phase-difference reception request means 102.

The OUT-point phase-difference reception request means 102 has a function to output the OUT-point phase-difference reception request signal S9 to the timing generating circuit 83 of the encoding circuit 61 when the comparison result from the OUT-point time code comparing means 101 indicates coincidence of both values and to subsequently output the OUT-point phase-difference value Dp2 stored in the OUT-point phase-difference storage area Z15 of the data RAM to the timing generating circuit 83.

The timing generating circuit 83 opens a gate for data input, for example, based on the input of the OUT-point phase-difference reception request signal S9 from the OUT-point phase-difference reception request means 102, receives the OUT-point phase-difference value Dp2 subsequently input thereto, and starts counting from the OUT-point phase-difference value Dp2.

The second switching command means 103 counts the audio frame pulse Pau output from the timing generating circuit 83 based on the input of the phase-difference reading request signal S9 output from the OUT-point phase-difference reading request means 102, and outputs the second switching command signal S10 to the switching controlling circuit 67 of the encoding circuit 61 when the count value reaches a predetermined count value.

In this embodiment, the predetermined count value is set to "6", for example, and stored in a register R12 allocated in the computer 54. Therefore, in the example shown in FIG. 9, since a point when the OUT-point phase-difference reception request means 102 outputs the OUT-point phase-difference reception request signal S9 is just a point of the OUT point (time code Ct (k)) and is also a point delayed by a two-video-frame amount in the data recording system 52, a point when an audio frame immediately after the OUT point appears in the data recording system 52 is a point when six audio frames have passed since an output point of the OUT-point phase-difference reception request signal S9.

Therefore, since the second switching command means 103 outputs the second switching command signal S10 when counting six audio frame pulses from the data reproducing system 53 after the OUT point, the switching circuit 68 carries out its switching operation at the start point of the audio frame (m+1) next to the audio frame (m) including the OUT point of the encoded data da from the encoding circuit 61, thereby the data to be supplied to the error code adding circuit 62 at the succeeding stage being switched from the encoded data da to the error-corrected data dap from the delay circuit 69. In the example shown in FIG. 9, the error-corrected data dap after the audio frame (M+1) from the delay circuit 69 continuously succeeds the encoded data da of the audio frame (m).

The respective time code comparing means 98 and 101 compare the time code from the time code extracting circuit 70 and the value obtained by adding the time code stored in the data RAM with the value of a two-video-frame amount, because the preceding reproducing head reproduces a data of a video frame preceding by a two-video-frame amount a video frame recorded by the succeeding recording head. Since the recording is started with a delay of a two-video-frame amount as described above, it becomes possible to record the data, added with the error code, of encoded data da of the external audio data Da from the IN point detected by the preceding reproducing head and supplied from the outside, and it also becomes possible to record the data, added with the error code, of the error-corrected data dap from the OUT point detected by the preceding reproducing head and supplied from the delay circuit 69.

Figure 4:
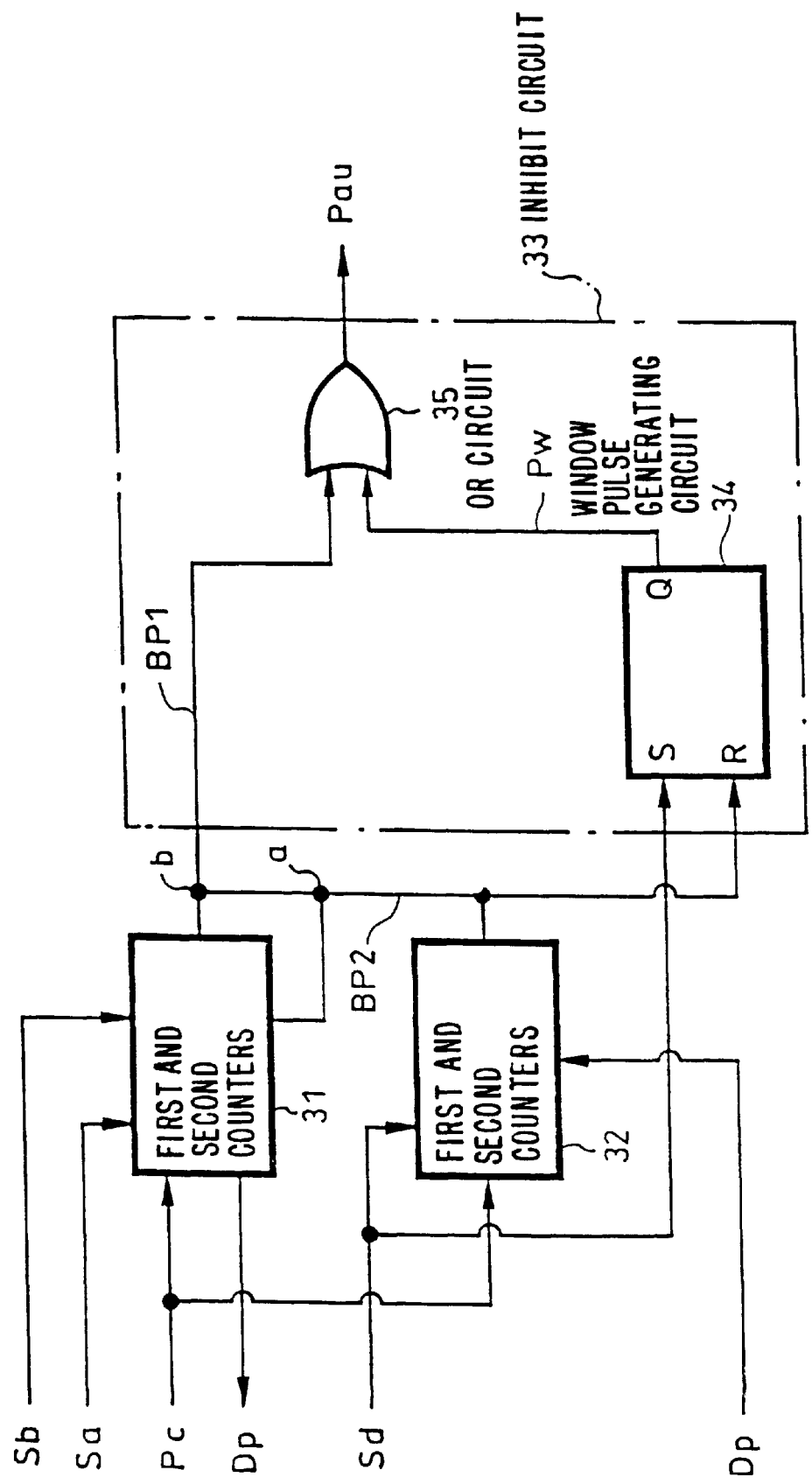
FIG. 4 is a block diagram showing a specific arrangement of the timing generating circuit incorporated in the encoding apparatus by way of example.
Figures 7A, 7B:
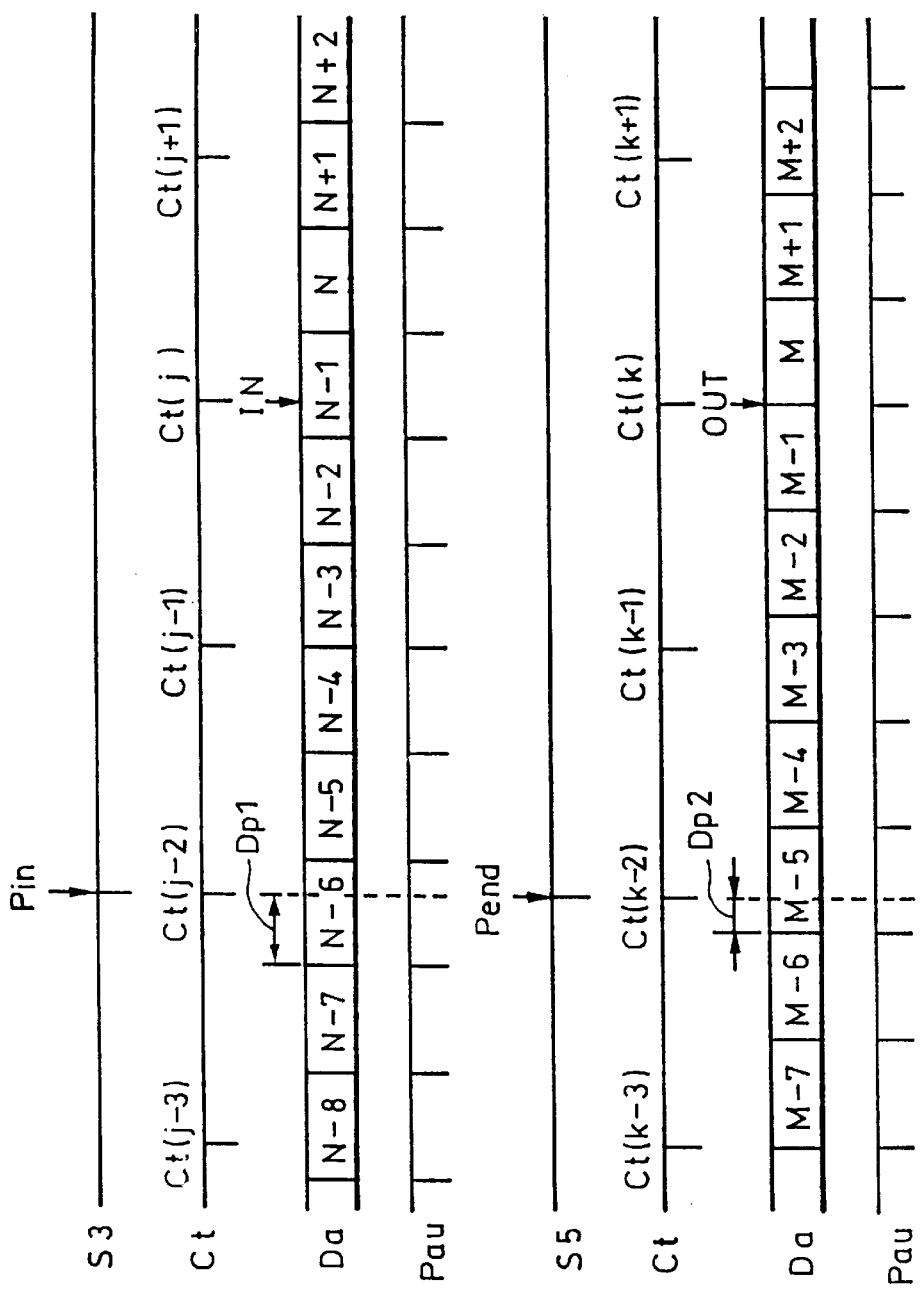
FIG. 7 is a timing chart showing respective signal processings of an IN-point determining processing and an OUT-point determining processing which are carried out before the insertion edition.

If a circuit having an arrangement shown in FIG. 4, for example, is employed as the timing generating circuit 83, the wiring is carried out in the circuit such that the start signal S1 from the start-signal outputting means 92 is input as the start signal Sa to the first counter 31 and such that the IN-point phase-difference reading request signal S3 output from the IN-point phase-difference reading request means 93 and the OUT-point phase-difference reading request signal S5 output from the OUT-point phase-difference reading request means 95 are input as the signal Sb to the first counter 31.

Moreover, the wiring is carried out in the circuit such that the phase-difference value Dp output from the first counter 31 is supplied to the IN-point phase-difference storage means 94 and the OUT-point phase-difference storage means 95. The wiring is carried out in the circuit such that the IN-point phase-difference reception request signal S7 output from the IN-point phase-difference reception request means 99 and the OUT-point phase-difference reception request signal S9 output from the OUT-point phase-difference reception request means 102 are input as the signal Sd to the second counter 32.

The IN-point phase-difference storing means 94 permits interruption of the data input when the IN-point phase-difference reading request means 93 outputs the IN-point phase-difference reading request signal S3 and prohibits the interruption of the data input when it is input with the phase-difference value Dp from the first counter 31. The OUT-point phase-difference storing means 96 is arranged similarly.

There will be described with reference to FIGS. 7 to 9 which are timing charts as well as other figures processings of the timing controlling means 91 and the timing generating circuit 83 of the computer 54, particularly processings of insertion edition in which the audio data supplied from the outside (e.g., the digital VTR) is temporarily recorded on a magnetic tape by operating keys to input commands indicative of start of the insertion recording and an end of the insertion recording and thereafter a new audio data supplied from the outside is recorded on the magnetic tape between the IN point and the OUT point while the magnetic tape is being reproduced.

In the insertion edition, a processing for determining the IN point and the OUT point is initially carried out before a n actual edition processing.

The processing for determining the IN point and the OUT point is carried out as follows. Initially, a start time and an end time are input through the key input means connected to the computer 54. Particularly, the start time is stored in the start time storing area Z11 of the data RAM. At this time, the computer outputs a stand-by request signal to the digital VTR, and the digital VTR starts reproducing the magnetic tape loaded thereto based on the input of the stand-by request signal from the computer.

When the digital VTR starts reproducing the magnetic tape, the digital VTR outputs the audio data Da and further outputs the time code Ct and the vide frame pulse Pvf both of which are synchronized with the video frame.

The time code Ct output from the digital VTR is supplied to the start-signal outputting means 92, the IN-point phase-difference reading request means 93, and the OUT-point phase-difference reading request means 95 of the timing controlling means 91 incorporated in the computer 54. At this time, the switching circuit 68 is set in its initial state, thereby the encoded data da from the encoding circuit 61 being supplied to the error-code adding circuit 62 at the succeeding stage.

The start-signal outputting means 92 outputs the start signal S1 to the timing generating circuit 83 of the encoding circuit 61 when the time indicated by the time code Ct supplied thereto becomes the start time stored in the start time storage area.

The timing generating circuit 83 starts counting the reference clock PC from the reference clock generator 82 based on the input of the start signal S1 from the computer 54. The timing generating circuit 83 can count in the range from "1" to "1152" and therefore counts such that when the count value reaches "1152", then the count value returns to "1". Then, every time when the count value becomes "1", the timing generating circuit outputs one audio frame pulse Pau. Therefore, at a point when the timing generating circuit 83 is input with the start signal S1, the timing generating circuit outputs one audio frame pulse Pau. Thereafter, every time when the timing generating circuit counts the 1152 reference clocks Pc, the timing generating circuit outputs one audio frame pulse Pau.

Thus, the timing generating circuit 83 successively outputs the audio frame pulse Pau and supplies it to the encoder 81. The encoder 81 starts encoding the audio data Da by employing the input point of the audio frame pulse Pau output from the timing generating circuit 83 as a start point for encoding the audio data. Specifically, the encoder 81 divides the audio data Da successively output from the digital VTR into 1152 sample units and encodes them.

The time code adding circuit 84 adds the encoded data da with the time code Ct, and further the error code adding circuit 62 adds the encoded data with the error code used for error correction. Finally, the encoded data is recorded on the magnetic tape T through the recording unit 63 and the succeeding recording head.

When the operator input data indicative of the start point Pin of the insertion recording by operating a key of the key input means, the interruption signal S2 produced by the key input is input to the IN-point phase-difference recording request means 93. The IN-point phase-difference reading request means 93 outputs the IN-point phase-difference reading request signal S3 to the timing generating circuit 83 of the encoding circuit 61 based on the input of the interruption signal S2, and simultaneously stores the current time code Ct in the IN-point time storage area Z12 of the data RAM.

The timing generating circuit 83 outputs the current count value as the IN-point phase-difference value Dp1 (see FIG. 7A) to the computer 54 based on the input of the IN-point phase-difference reading request signal S3 from the computer 54. The IN-point phase-difference value Dp1 transmitted from the timing generating circuit 83 is supplied to the IN-point phase-difference storing means 94 and then stored thereby in the IN-point phase-difference storage area Z13 of the data RAM.

Thereafter, when the operator operates a key of the key input device to input a command Pend indicative of an end of the insertion recording, an interruption signal S4 produced by this key input is input to the OUT-point phase-difference reading request means 95. THis OUT-point phase-difference reading request means 95 outputs the OUT-point phase-difference reading request signal S5 to the timing generating circuit 83 of the encoding processing circuit 61 based on the input of the interruption signal S4 and simultaneously stores the current time code Ct in the OUT-point time storage area Z14 of the data RAM.

The timing generating circuit 83 outputs the current count value as the OUT-point phase-difference value Dp2 (see FIG. 7B) to the computer 54 based on the input of the OUT-point phase-difference reading request signal S5. The OUT-point phase-difference value Dp2 transmitted from the timing generating circuit 83 is supplied to the OUT-point phase-difference storing means 96 of the timing controlling means 91 and then stored in the OUT-point phase-difference storage area Z15 of the data RAM.

When all the audio data Da transmitted from the digital VTR are encoded by the encoding circuit 61 and then recorded as the encoded data da on the magnetic tape T, the processing for determining the IN point and the OUT point is finished.

An actual insertion edition will actually be carried out next. This editing processing is carried out when the preceding reproducing head starts reproducing the magnetic tape T. Soon after the above reproduction is started, the computer 54 outputs the control signal to the switching circuit 68. Based on the control signal, the switching circuit 68 switches the data to be input to the error code adding circuit 62 to the error-corrected data dap from the error correcting circuit 65 of the data reproducing system 53.

When the above reproduction is carried out, the delay circuit 69 delays the error-corrected data dap from the error correcting circuit 65 by a predetermined time and supplies the data through the switching circuit 68 to the error code adding circuit 62 in which the supplied data is added with the error code again. The data output from the error code adding circuit 62 is supplied to the recording unit 63 at the succeeding stage and recorded thereby on the magnetic tape T. In this case, since the delay circuit 69 delays the data by the predetermined time, the reproduced data added again with the error code are recorded again on the track where the reproduced data was once recorded.

The time code extracting circuit 70 extracts the time code Ctp from the error-corrected data dap from the error correcting circuit 65 and supplies it to the computer 54. The time code Ctp from the time code extracting circuit 70 is supplied to the edition start signal outputting means 97, the IN-point time code comparing means 98 and the OUT-point time code comparing means 101 of the computer 54.

The edition start signal outputting means 97 outputs an edition start signal S6 to the timing generating circuit 83 of the encoding circuit 61 when a time indicated by the time code Ctp supplied from the time code extracting circuit 70 reaches the start time stored in the start time storage area The timing generating circuit 83 starts counting the reference clock Pc from the reference clock generator 82 based on the input of the edition start signal S6 from the computer 54 and outputs one audio frame pulse Pau every time when the count value becomes "1".

As described above, while the error-corrected data dap from the data reproducing system 53 are successively added with the error codes and then recorded on the magnetic tape T, when the time code Ctp from the time code extracting circuit 70 becomes the time code (time code Ct (J) in the example shown in FIG. 8) indicative of the IN point, the IN-point time code comparing means 98 outputs the comparison result indicative of the coincidence of both values. Therefore, the IN-point phase-difference reception request means 99 outputs the IN-point phase-difference reception request signal S7 to the timing generating circuit 83 of the encoding circuit 61 at this time and then outputs the IN-pint phase-difference value Dp1 stored in the IN-point phase-difference storage area Z13 of the data RAM to the timing generating circuit 83.

In this case, since the IN-point phase-difference value Dp1 is the count value from the start point of the audio frame (audio frame (N−6)) immediately before the insertion recording start pint Pin in the IN-point determining processing to the start point of the video frame (j−2) including the insertion recording start point Pin, if the timing generating circuit 83 starts counting the reference clock Pc from the IN-point phase-difference value Dp1, then a time from the count start point to a point when the count value is returned to "1", is the same as a time from the start point of the video frame (j−2) of the reproduced data (precisely the error-corrected data dap from the delay circuit 69) to a point when the audio frame is changed to the audio frame (N−5).

Specifically, it means that when the encoding circuit 61 encodes a new audio data Da, a phase difference between the start point of the video frame (j−2) of the reproduced data and the start point of the audio frame (N−5) is reproduced.

As a result, when a new audio data Da input from the outside is encoded, an output timing of the audio frame pulse Pau after the video frame (J−2) is synchronized with an output timing of the audio frame pulse Pau used in encoding the above reproduced data.

The IN-point phase-difference reception request signal S7 is also supplied to the first switching command means 100. Thus, the first switching command means 100 starts counting the audio frame pulse Pau from the timing generating circuit 83. When the count value reaches the predetermined count value stored in the register R11, the first switching command means 100 outputs the first switching command signal S8. In the example shown in FIG. 8, when the audio frame pulse Pau with respect to the audio frame (N) is supplied, the first switching command means outputs the first switching command signal S8 to the switching controlling circuit 67.

The switching controlling circuit 67 outputs the switching control signal Ssw having a high level to the switching circuit 68 based on the input of the first switching command signal S8. Based on the input of the switching control signal, the switching circuit 68 switches the data to be input to the error code adding circuit 62 at the succeeding stage from the error-corrected data dap from the delay circuit 69 to the new encoded data da output from the encoding circuit 61.

Thus, since the encoded data after the audio frame (n+1) of the newly encoded data from the outside becomes continuous from the audio frame immediately after the IN point (the audio frame (N) immediately after the video frame (j) in the example shown in FIG. 8), the data edition (insertion edition) at the IN-point is reliably carried out.

Thereafter, until the time code reaches the time code indicative of the OUT point, the encoded data da of the audio data Da from the outside output from the encoding circuit 61 is recorded on the magnetic tape T by the recording unit 63 and the succeeding recording head.

Figure 9:
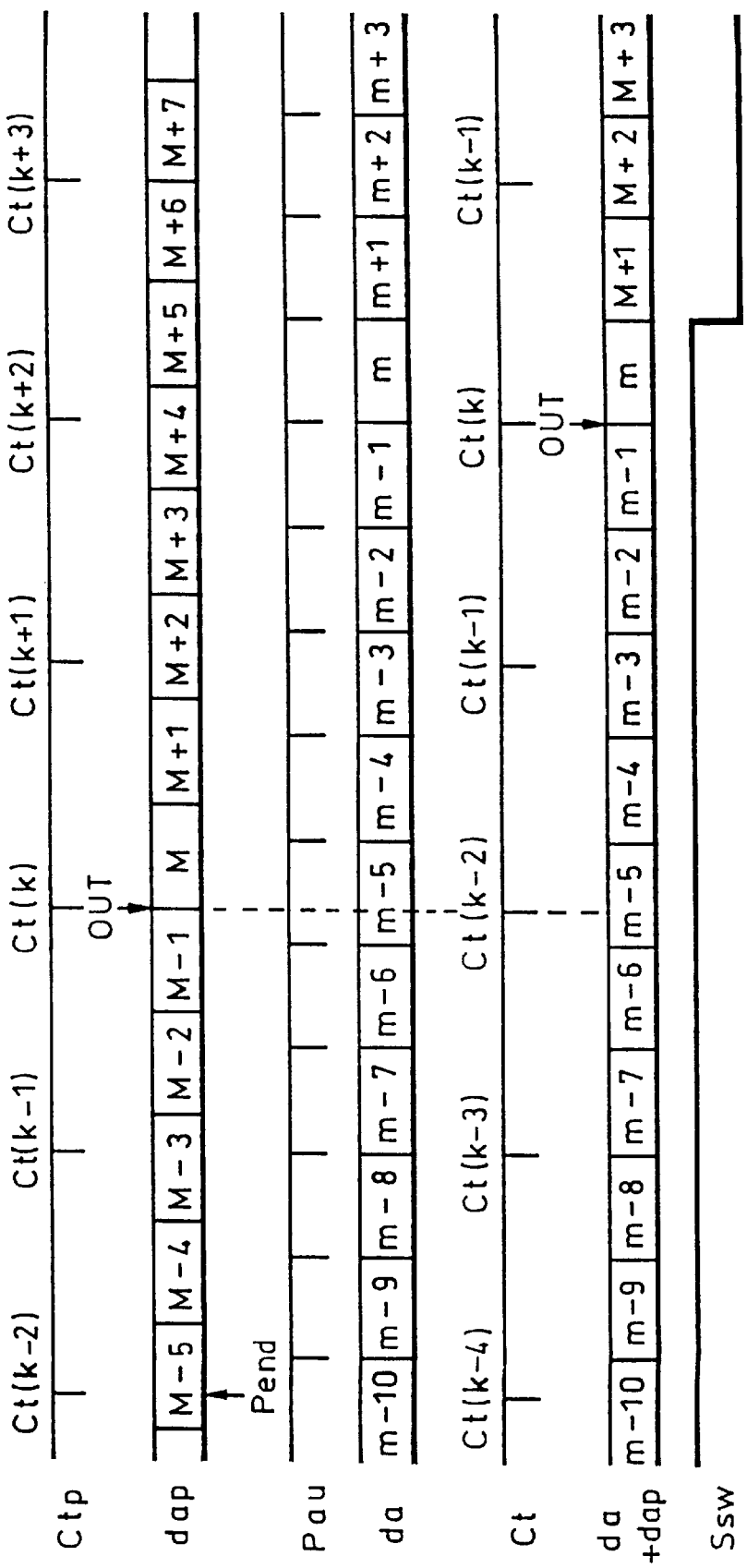
FIG. 9 is a timing chart showing a signal processing at an OUT point of the insertion edition of the data recording apparatus according to the embodiment.
Figure 10:
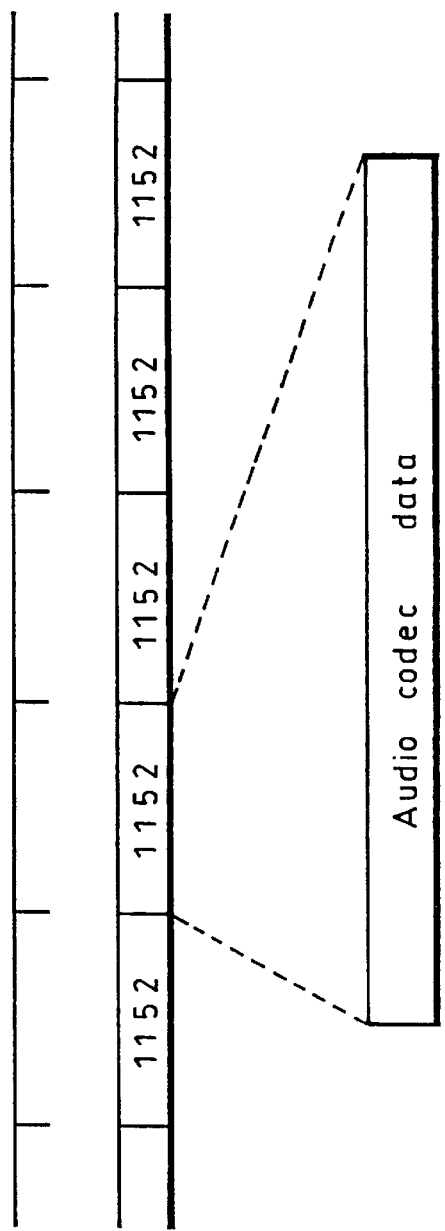
FIG. 10 is a diagram showing a bit stream of an encoded audio data.
Figure 11:
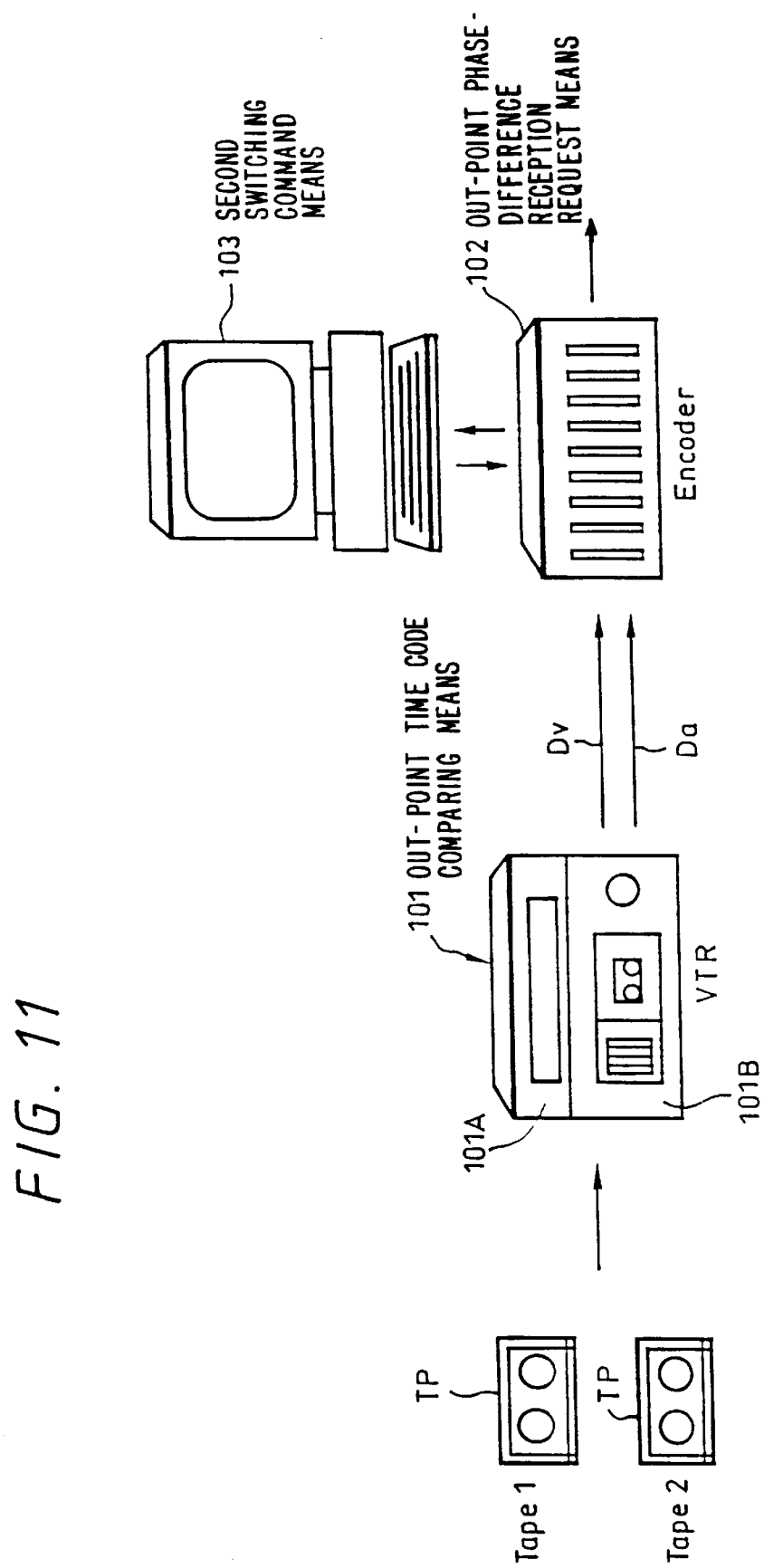
FIG. 11 is a structural diagram showing an editing system (authoring system) for a DVD employing an encoder for simultaneously encoding a video data and an audio data.

As described above, while the newly encoded data da from the encoding circuit 61 are successively added with the error codes and then recorded on the magnetic tape T, when the time code Ctp from the time code extracting circuit 70 reaches the time code (time code Ct (k) in the example shown in FIG. 9) indicative of the OUT point, the OUT-point time code comparing means 101 outputs the comparison result indicative of the coincidence of both values. Therefore, at the above time, the OUT-point phase-difference reception request means 102 outputs the OUT-point phase-difference reception request signal S9 to the timing generating circuit 83 of the encoding circuit 61 and subsequently outputs the OUT-point phase-difference Dp2 stored in the OUT-point phase-difference storage area Z15 of the data RAM to the timing generating circuit 83.

In this case, since the OUT-point phase-difference value Dp2 is a count value from the start point of the audio frame (audio frame (M−5)) immediately before the insertion recording end point Pend in the OUT-point determining processing to the start point of the video frame (k−2) in the insertion recording end point Pend, if the timing generating circuit 83 starts counting the reference clock Pc from the OUT-point phase-difference value Dp2, then the time from the start point of the above counting processing to a point where the count value is returned to a value of "1" is the same as a time from the start point of the video frame (k−2) to a point when the audio frame is changed to the audio frame (M−4).

Specifically, the phase difference from the start point of the video frame (m) of the reproduced data (the error-corrected data) from the error correcting circuit to the start point of the audio frame (M) thereof is reproduced.

As a result, when the audio data Da newly input from the outside is encoded, the output timing of the audio frame pulse Pau output after the video frame (k−2) is synchronized with the output timing of the audio frame pulse Pau used in the processing for encoding the above reproduced data.

The OUT-point phase-difference reception request means outputs the OUT-point phase-difference reception request signal S9 also to the second switching command means 103, thereby the second switching command means 103 starting its operation of counting the audio frame pulse Pau from the timing generating circuit 83. When the count value reaches the predetermined count value stored in the register R12, the second switching command means 103 outputs the second switching command signal S10. In the example shown in FIG. 9, when the audio frame pulse Pau corresponding to the audio frame (M+1) is supplied to the second switching command means outputs the second switching command signal S10 to the switching controlling circuit 67.

The switching controlling circuit 67 outputs the switching control signal Ssw having a low level to the switching circuit 68 based on the input of the second switching command signal S10. Based on the input switching control signal, the switching circuit 68 switches the data to be input to the error code adding circuit 62 at the succeeding stage from the encoded data da from the encoding circuit 61 to the error-corrected data dap from the delay circuit 69.

Thus, the error-corrected data dap from the delay circuit becomes continuous from the audio frame (the audio frame (M+1) immediately after the video frame (k) in the example shown in FIG. 9) immediately after the OUT-point. The insertion edition is reliably finished at the OUT point.

While a recording apparatus (such as a digital VTR or the like) for recording and reproducing the encoded data da on and from the magnetic tape T to which the present invention is applied is described as the data recording apparatus according to the above embodiment by way of example, the present invention can be applied to processings for recording and reproducing the encoded data on and from, for example, a recordable magneto-optical disk which is a dish-shaped recording medium instead of the magnetic tape T.

In this case, any of a magnetic-field modulation system and an optical modulation system may be used. If the magnetic-field modulation system is employed, the data recording apparatus can be realized by employing as a recording magnetic head a magnetic-field generating means (excitation coil) for generating an external magnetic field in response to a logical value of the encoded data da and a laser light irradiating means (optical pickup) for heating a recording layer (vertical magnetized film) of a magneto-optical disk to a Curie temperature or higher and by making the above optical pickup serving also as a reproducing magnetic head in the reproducing unit.

If the optical modulation system is employed, the data recording apparatus can be realized by employing an excitation coil for generating a constant external magnetic field and a laser light irradiating means (optical pickup) for selectively heating a recording layer (vertical magnetized film) of a magneto-optical disk in response to a logical value of the encoded data da and by making the above optical pickup serving also as the reproducing magnetic head.

As described above, according to the data processing apparatus and the data processing method according to the present invention, in a data processing apparatus for and a data processing method of dividing information data supplied together with a reference timing with a plurality of sources being successively switched, into data of a predetermined processing unit to encode them, the phase difference between the predetermined reference timing preceding the switch point of the above sources and the start point of the above processing unit is kept and the start point of the processing for encoding the information data from the switched source by a processing unit is generated based on the above phase difference. Therefore, when the information data supplied together with the reference timing while a plurality of sources are switched are divided into data of a predetermined unit and the divided data are encoded, it is possible to keep continuity of the processing units used for the encoding at the point where sources are switched and to divide the source at an optional point regardless of a silent portion and so on.

According to the data recording apparatus and the data recording method of the present invention, in the data recording apparatus (or the data recording method) for dividing a digital data formed by inserting another information data into a reference information data input together with a reference timing into data of predetermined processing units to encode them and for recording the encoded data on the recording medium, the phase difference between the predetermined reference timing synchronized with the above reference timing and preceding the insertion start point indicative of the start of inserting another data into the reference information data and the start point of the above processing unit is held, the start point of the processing for encoding the above another information data by a processing unit is generated based on the above phase-difference, and the data to be encoded is switched from the above reference information data to the above another information data at the above encoding start point located after the insertion start point. Therefore, when the digital data formed by inserting another information data into a reference information data input together with a reference timing is divided into data of predetermined processing units and then encoded and the encoded data are recorded on the recording medium, it is possible to keep continuity of the processing units used for the encoding processing at the insertion point of the another data, and it is possible to make the encoded data of the reference information data and the encoded data of the another information data continuous at the above insertion point to record them on the recording medium.

INDUSTRIAL APPLICABILITY

The present invention is suitable for use in an authoring system for editing data to be recorded on a DVD (digital video disk), for example, and particularly an audio encoding apparatus.

I claim:

1. A data processing apparatus having encoding processing means for encoding data in which first information data from a first source of information is supplied together with a reference timing value and subsequently a plurality of successive sources of information data of a predetermined processing unit are input when said first information data is finished being supplied, said data processing apparatus comprising:

means for producing an encoding start point in which a phase difference value between a predetermined reference timing value obtained before said successive sources of information data are input and a start point of a successive processing unit is stored and in which said start point for the encoding of said information data from said successive sources of data is produced based on said phase difference value.

2. A data processing apparatus according to claim 1, in which said means for producing an encoding start point comprises:

a processing unit length counting means for counting a reference clock and for outputting, when the count value reaches a number indicative of said processing unit length, a signal indicative of an encoding start point, a phase-difference storing means for storing the count value from a first processing unit length counting means as a phase difference value before said successive sources of information data are inputted, and a phase difference supply means for supplying said phase difference stored by said phase difference storing means to a second processing unit length counting means when said predetermined reference timing of a successive source of information data is input and for starting the counting of said reference clock from said phase difference value.

3. A data processing apparatus according to claim 1, in which said plurality of successive sources of information data is audio data, said reference timing value is a pulse indicative of a video frame, and said processing unit is an audio frame.

4. A data processing apparatus according to claim 2, in which said phase-difference supply means comprises:

a fetch signal outputting means for comparing a reference timing value from said successive source of information data and said predetermined reference timing value and for outputting a phase-difference fetch signal to said processing unit length counting means when reference timings thereof are coincident with each other, and said processing unit length counting means switches a current count value to the phase difference stored by said phase-difference storing means based on the input of the phase-difference fetch signal from said fetch signal outputting means to start its counting processing from said phase difference.

5. A data processing apparatus according to claim 4, in which the fetch signal outputting means of said phase-difference supply means counts the reference timing with respect to the successive sources of information data and outputs, when the count value reaches a predetermined count value, the phase-difference fetch signal to said processing unit length counting means.

6. A data processing apparatus according to claim 2, in which said phase-difference storing means comprises a reference counting means for counting a reference timing with respect to the successive sources of information data and for outputting a storing request signal to said processing unit length counting means when its counted value reaches a predetermined count value, and said processing unit length counting means outputs the current count value to said phase-difference keeping means based on the input of the storing request signal from said reference counting means.

7. A data processing method of encoding data in which first information data from a first source of information is supplied together with a reference timing value and subsequently a plurality of successive sources of information data of a predetermined processing unit are input when said first information data is finished being supplied, said data processing method comprising the steps of storing a phase difference value which is the difference between a reference timing value obtained before said successive sources of information data are input and a start point of a successive processing unit, and producing said start point for the encoding of said information data from said successive sources of information data based on said phase difference value.

8. A data processing method according to claim 7, further comprising the steps of counting a processing unit length of a first source of information data so that a signal indicative of an encoding start point for a successive source of information can be outputted when its counted value reaches a value indicative of a processing unit length, storing a count value from a predetermined reference timing before a switch point of said successive sources of information data as a phase difference value, and starting a counting process from said phase difference value when successive sources of information data are inputted after said first source of information data is finished being supplied.

9. A data processing method according to claim 7, in which said plurality of successive sources of information data is audio data, said reference timing value is a pulse indicative of a video frame, and said processing unit is an audio frame.

10. A data processing method according to claim 8, wherein said step of counting said processing unit length comprises the steps of comparing a reference timing value from said successive sources of information with said predetermined reference timing value, switching a current value to the phase difference value when both of the reference timings are coincident with each other, and then starting a counting process from said phase difference value.

11. A data processing method according to claim 8, further comprising the steps of counting the reference timing value of the successive sources of information data, and starting a counting process from said phase difference value when the value of the count of the reference timing value reaches a predetermined count value.

12. A data processing method according to claim 8, further comprising the steps of counting a reference timing value of the successive sources of information data, and storing a current count value in the processing unit length count as said phase difference when the value of the count of the reference timing value reaches a predetermined count value.

13. A data processing method according to claim 8, in which said step of counting a processing unit length comprises counting said reference clock and outputting its count value in the form of a signal indicative of an encoding start point when the count value reaches a number indicative of a processing unit length, counting said reference clock from said phase difference upon an input of said predetermined timing of reference timings with respect to the information data from said switched source, and, when its count value reaches a value indicative of a processing unit length, outputting a start-point generation reference signal and at the same time resetting a count value obtained by counting said reference clock, and inhibiting an output of said start point generation reference signal, from an input of said predetermined reference timing with respect to the information data from the switched sources to an output of said start-point generation reference signal, and setting as a start point of said encoding processing a timing at which said start-point generation reference signal is output during said inhibit step.

14. A data recording apparatus having encoding processing means for encoding data in which digital data is formed by inputting information data from successive sources having a predetermined processing unit into reference information data which is supplied together with a reference timing value, and a data recording means for recording encoded data from said encoding processing means on a recording medium, said data recording apparatus comprising:

means for producing an encoding start point storing a phase difference value between a predetermined reference timing value and a start point of said successive processing unit and inputting said additional information data from successive sources into said reference information data at said start point;

means for producing an encoding start point for encoding successive information data by a processing unit based on said phase difference value; and means for switching information data to be input to the encoding processing means from said reference information data to said information data from said successive sources at said encoding start point.

15. A data recording apparatus according to claim 14, in which said means for producing an encoding start point comprises a processing unit length counting means for counting a reference clock and for outputting, when its count value reaches a number indicative of said processing unit length, the count value as an encoding start point, a phase-difference storing means for storing a count value from a first processing unit length counting means as a phase difference value before inputting said information from successive sources, and a phase difference supply means for supplying said phase difference stored by said phase difference storing means to a second processing unit length counting means when said predetermined reference timing of a successive source of information data is input and for starting the counting operation from said phase difference value.

16. A data recording apparatus according to claim 14, in which said information data from successive sources is audio data, said reference timing value is a pulse indicative of a video frame, and said processing unit is an audio frame.

17. A data recording apparatus according to claim 15, in which said phase-difference supply means comprises:

a fetch signal outputting means for comparing a reference timing value from successive sources of information data to be input and said predetermined reference timing value and for outputting a phase-difference fetch signal to said processing unit length counting means when both of the reference timings are coincident with each other, and said processing unit length counting means switches a current count value to the phase difference stored by said phase-difference storing means based on the input of the phase-difference fetch signal from said fetch signal outputting means to start its counting processing from said phase difference.

18. A data processing apparatus according to claim 15, in which said phase-difference storing means comprises a reference counting means for counting a reference timing with respect to the successive sources of information data to be input and for outputting a storing request signal to said processing unit length counting means when its count value reaches a predetermined count value, and said processing unit length counting means outputs a current count value to said phase-difference storing means based on an input of the storing request signal from said reference counting means.

19. A data recording apparatus according to claim 17, in which said processing unit length counting means comprises a first counting means for counting a reference clock and for outputting a start point generation signal when its count value reaches a processing unit length, a second counting means for starting the counting of said reference clock from said phase difference based on an input of a fetch signal from said fetch signal outputting means, for outputting a start point generation reference signal when its count value becomes a number indicative of the processing unit length, and for simultaneously resetting the count value of the said first counting means, and an inhibit means for inhibiting an output of said start-point generation reference signal from an output of said fetch signal to an output of said start-point generation reference signal, and wherein said start-point generation reference signal output by said inhibit means is set as a start point of said encoding processing.

20. A data recording method for recording encoded data formed by inputting information data from successive sources having a predetermined processing unit; into reference information data which is supplied together with a reference timing value, said data recording method comprising the steps of storing a phase difference value between a predetermined reference timing value and a start point of said successive processing unit inputting said information data from successive sources into said reference information data at a start point, generating a start point for encoding said another information data by a processing unit based on said phase difference; and switching information data to be input for encoding from said reference information data to said information data from successive sources at said encoding start point.

21. A data recording method according to claim 20, further comprising the steps of counting a reference clock and outputting, when its count value reaches a number indicative of a processing unit length, a signal indicative of an encoding start point, storing as a phase difference a count value at a predetermined reference timing before said insertion start point, and starting a counting operation from said phase difference value when said predetermined reference timing value of the reference timings, with respect to the reference information data to be inputs is input.

22. A data recording method according to claim 20, in which said information data from successive sources is audio data, said reference timing value is a pulse indicative of a video frame, and said processing unit is an audio frame.

23. A data recording method according to claim 21, further comprising the steps of comparing a reference timing value of the information data to be input and said predetermined reference timing value switching a current count value to said phase difference value when both of the reference timings are coincident with each other, and then starting a counting process from said phase difference value.

24. A data processing method according to claim 21, comprising the steps of counting a reference timing value of the reference information data to be input, and starting a counting processing from said phase difference when its count value becomes a predetermined count value.

25. A data recording method according to claim 21, in which said step of counting a processing unit length comprises counting a reference clock and outputting a signal indicative of an encoding start point when its count value reaches a number indicative of a processing unit length, starting a counting process from said phase difference upon an input of said predetermined reference timing of the reference timings of the reference information data to be input, to output a start point generation reference signal when its count value becomes a processing unit length, and for simultaneously resetting a count value obtained by counting said reference clock, and inhibiting an output of said start-point generation reference signal from the input of said predetermined reference timing to the output of said start-point generation reference signal, and setting as a start point of said encoding processing a timing at which said start-point generation reference signal is output during said inhibit step.

26. A data processing apparatus for encoding audio data in which initial audio data from a first source of audio data is supplied with a video frame pulse for keeping said audio data synchronized with matching video data when subsequent audio data from additional sources of audio data are inputted, said data processing apparatus comprising:

means for obtaining a difference between the value of the video frame pulse before the additional source of audio data is inputted and the start point of the successive audio data;

means for storing said difference as a phase difference value; and means for producing an encoding start point for the additional sources of audio data to keep the audio and video data synchronized based on said phase difference value.

* * * * *